(12) United States Patent
Lin et al.

(10) Patent No.: US 9,578,067 B2
(45) Date of Patent: Feb. 21, 2017

(54) INTERCEPTING USER EQUIPMENT AND LAWFUL INTERCEPTION METHOD THEREOF FOR USE IN 3GPP DIRECT MODE COMMUNICATION

(71) Applicant: Institute for Information Industry, Taipei (TW)

(72) Inventors: Yi-Ting Lin, New Taipei (TW); Yi-Hsueh Tsai, New Taipei (TW); Kanchei Loa, Taipei (TW)

(73) Assignee: Institute For Information Industry, Taipei (TW)

( * ) Notice: Subject to any disclaimer, the term of this patent is extended or adjusted under 35 U.S.C. 154(b) by 0 days.

(21) Appl. No.: 15/223,279

(22) Filed: Jul. 29, 2016

(65) Prior Publication Data
US 2016/0337408 A1 Nov. 17, 2016

Related U.S. Application Data

(63) Continuation-in-part of application No. 13/757,768, filed on Feb. 2, 2013, now abandoned.

(60) Provisional application No. 61/672,785, filed on Jul. 18, 2012, provisional application No. 61/642,466, filed on May 4, 2012, provisional application No. 61/595,133, filed on Feb. 5, 2012.

(51) Int. Cl.
| | |
|---|---|
| *H04M 3/22* | (2006.01) |
| *H04L 29/06* | (2006.01) |
| *H04W 12/00* | (2009.01) |
| *H04W 52/38* | (2009.01) |

(52) U.S. Cl.
CPC ............ *H04L 63/306* (2013.01); *H04W 12/00* (2013.01); *H04W 52/386* (2013.01)

(58) Field of Classification Search
CPC .. H04W 64/00; H04W 24/00; H04W 52/0206; H04W 84/045; H04W 24/02; H04W 76/02
See application file for complete search history.

(56) References Cited

U.S. PATENT DOCUMENTS

| | | | |
|---|---|---|---|
| 2002/0004819 A1 | 1/2002 | Agassy | |
| 2002/0187784 A1* | 12/2002 | Tigerstedt | H04W 36/0088 455/439 |
| 2004/0203582 A1 | 10/2004 | Dorenbosch et al. | |
| 2008/0244702 A1 | 10/2008 | Kropivny | |
| 2009/0262673 A1 | 10/2009 | Hermersdorf | |
| 2010/0086119 A1* | 4/2010 | De Luca | H04M 3/2281 379/213.01 |
| 2013/0203380 A1 | 8/2013 | Lin et al. | |

* cited by examiner

*Primary Examiner* — Quan M Hua
(74) *Attorney, Agent, or Firm* — Skaar Ulbrich Macari, P.A.

(57) ABSTRACT

An intercepting user equipment and a lawful interception method thereof are provided. The intercepting user equipment registers to the administrating server for lawful interception, and then receives a positive interception message from the administrating server. The intercepting user equipment receives a signal from user equipment, and determines whether a power measurement of the signal exceeds a threshold. If positive, the intercepting user equipment transmits a power adjustment request to the administrating server so that the administrating server notifies the eNB of transmitting a power adjustment command to the user equipment for adjusting transmitting power. The intercepting user equipment intercepts communication data of the user equipment.

15 Claims, 28 Drawing Sheets

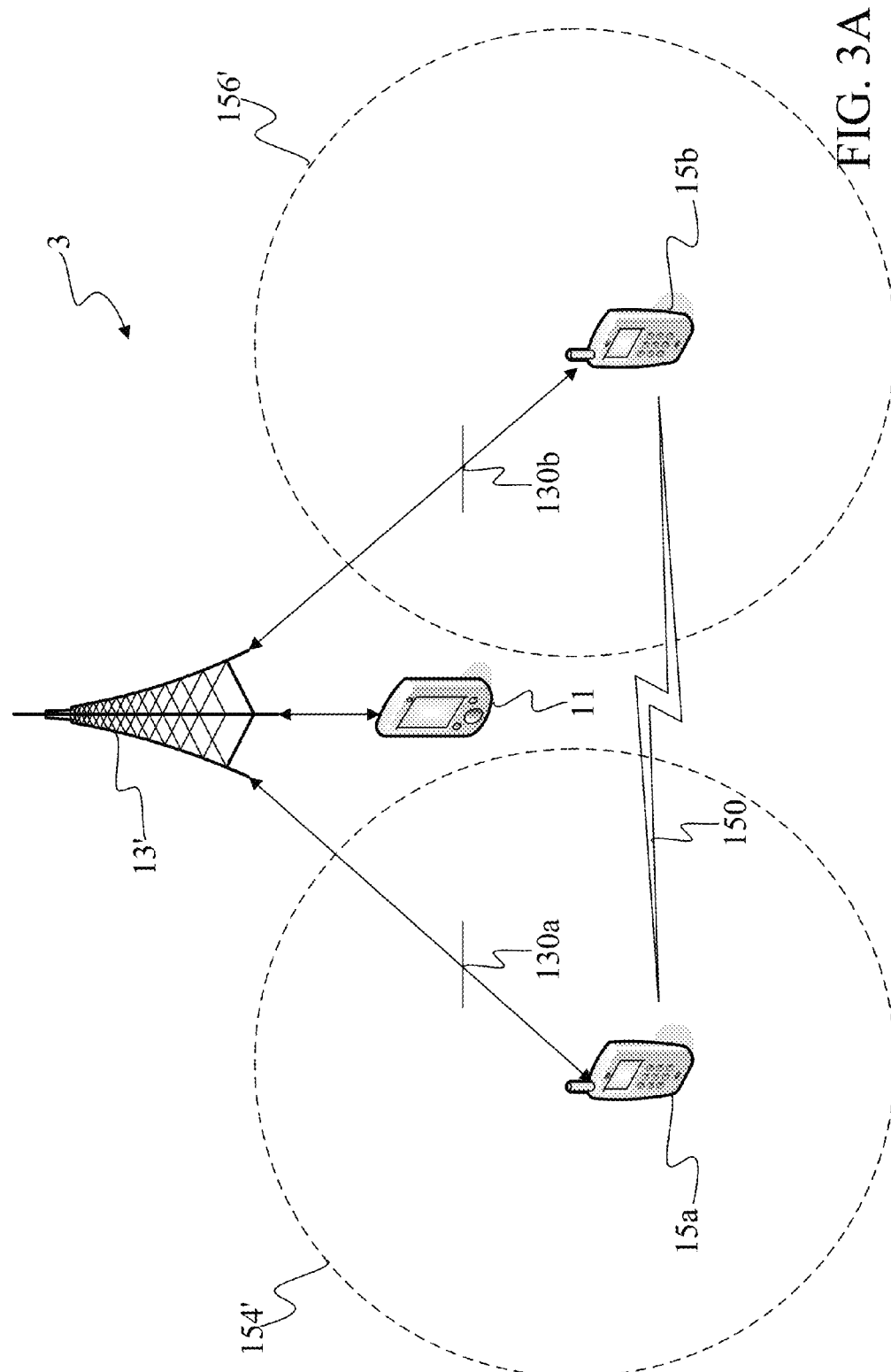

INTERCEPTING USER EQUIPMENT AND LAWFUL INTERCEPTION METHOD THEREOF FOR USE IN 3GPP DIRECT MODE COMMUNICATION

PRIORITY

This application is a continuation in part of U.S. application Ser. No. 13/757,768, filed Feb. 2, 2013, which claims the benefit of U.S. Provisional Application Ser. No. 61/595,133 filed on Feb. 5, 2012, U.S. Provisional Application Ser. No. 61/642,466 filed on May 4, 2012, and U.S. Provisional Application Ser. No. 61/672,785 filed on Jul. 18, 2012. The entirety of each of the foregoing applications is hereby incorporated by reference herein.

FIELD

The present invention relates to a network device, a core network, a direct mode communication system and a lawful interception method thereof. More particularly, the network device, the core network, the direct mode communication system and the lawful interception method thereof are arranged for intercepting the communications between mobile stations used in direct mode communication.

BACKGROUND

For security reasons, legal communication intercepting techniques are necessary. In the general communication systems, mobile stations connect to backend network directly, and have to exchange data (voice data, text data etc.) with each other via the backend network. In other words, the data exchanged between the mobile stations must be processed by the backend work. Therefore, when an inception is authorized by the court, an authorized user needs to ask the operator of the backend network for obtaining the data which is exchanged between the mobile stations and stored in the backend network.

However, in the developing 3GPP direct mode communication network, although mobile stations still connect to backend network, they exchange data with each other directly. In other words, in 3GPP direct mode communication network, the data exchange between the mobile stations will not be processed by the backend network. Accordingly, an authorized user cannot obtain the data exchanged between the mobile stations from the backend network since the data may not be stored in the backend network.

Accordingly, in order to implement lawful interception for 3GPP direct mode communication network, corresponding protocols and hardware devices differed from the general communication system are needed.

SUMMARY

To solve the aforesaid problem, the present invention provides a network device, a core network, a direct mode communication system and a lawful interception method thereof, which can be used for intercepting the communications between mobile stations adapted to direct mode communication.

The disclosure includes a lawful interception method for a direct mode communication system. The direct mode communication system comprises a network device and a core network. A first mobile station and a second mobile station connect to the core network respectively. The lawful interception method comprises the steps of: (a) enabling the network device to register to the core network for intercepting a communication between the first mobile station and the second mobile station; (b) enabling the network device to retrieve a communication data by intercepting the communication; (c) enabling the core network to receive the communication data from the network device; and (d) enabling the core network to store the communication data.

The disclosure also includes a direct mode communication system which comprises a network device and a core network connecting to a first mobile station and a second mobile station respectively. The network device registers to the core network for intercepting a communication between the first mobile station and the second mobile station, and retrieves a communication data by intercepting the communication. The core network receives the communication data from the network device and stores the communication data.

The disclosure further includes a lawful interception method for an intercepting user equipment. The intercepting user equipment is used in a 3GPP direct mode communication system. The 3GPP direct mode communication system comprises an administrating server and an eNB. The lawful interception method comprising the steps of: (a) registering, by the intercepting user equipment, to the administrating server via the eNB for lawful interception; (b) receiving, by the intercepting user equipment, a positive interception message from the administrating server via the eNB after step (a) while the positive interception message comprises a first identification of a first user equipment; (c) receiving, by the intercepting user equipment, a first signal from the first user equipment based on the first identification; (d) determining, by the intercepting user equipment, that a first power of the first signal does not exceed a threshold; (e) transmitting, by the intercepting user equipment, a power adjustment request to the administrating server via the eNB based on the result of step (d) so that the administrating server notifies the eNB of transmitting a power adjustment command to the first user equipment for adjusting transmitting power of the first user equipment; and (f) intercepting, by the intercepting user equipment, communication data of the first user equipment based on the first user identification after step (e).

The disclosure additionally includes an intercepting user equipment for use in a 3GPP direct mode communication system. The 3GPP direct mode communication system comprises an administrating server and an eNB, and the intercepting user equipment comprises a transceiver and a processor. The processor is configured to: register to the administrating server by the transceiver via the eNB for lawful interception; receive a positive interception message from the administrating server by the transceiver via the eNB after registering to the administrating server while the positive interception message comprises a first identification of a first user equipment; receive a first signal from the first user equipment by the transceiver based on the first identification; determine that a first power of the first signal does not exceed a threshold; transmit a power adjustment request to the administrating server by the transceiver via the eNB based on the determination of that the first power does not exceed the threshold so that the administrating server notifies the eNB of transmitting a power adjustment command to the first user equipment for adjusting transmitting power of the first user equipment; intercept communication data of the first user equipment based on the first user identification by the transceiver.

The detailed technology and preferred embodiments implemented for the subject invention are described in the following paragraphs accompanying the appended drawings for people skilled in this field to well appreciate the features of the claimed invention.

BRIEF DESCRIPTION OF THE DRAWINGS

FIG. 3A is a schematic view of a direct mode communication system of a third embodiment of the present invention;

DETAILED DESCRIPTION

In the following description, the present invention will be explained with reference to certain example embodiments thereof. However, these example embodiments are not intended to limit the present invention to any specific examples, embodiments, environment, applications or particular implementations described in these example embodiments. Therefore, description of these example embodiments is only for purpose of illustration rather than to limit the present invention. It should be appreciated that, in the following example embodiments and the attached drawings, elements unrelated to the present invention are omitted from depiction.

Figure 1A:
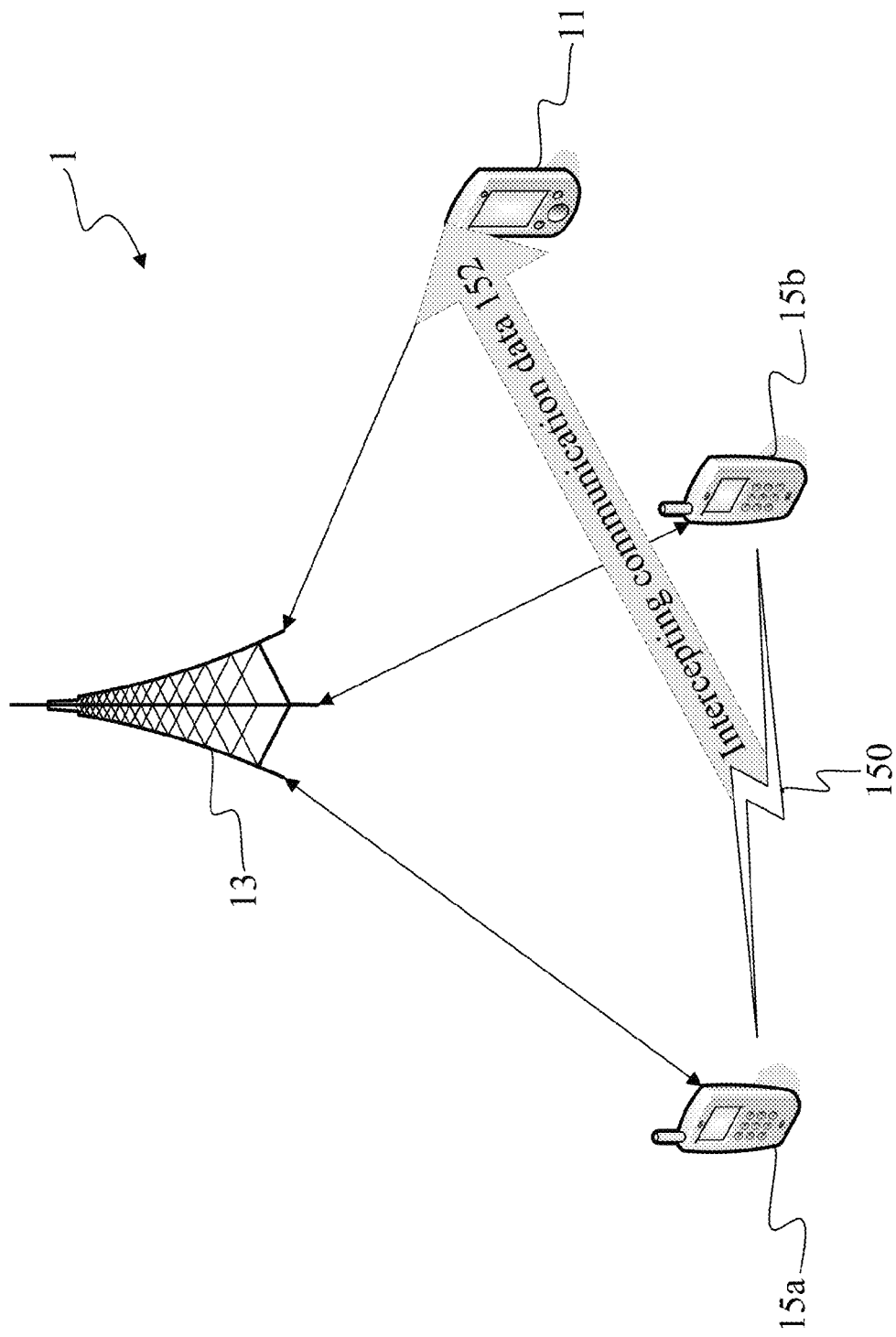
FIG. 1A is a schematic view of a direct mode communication system of a first embodiment of the present invention.
Figure 1B:
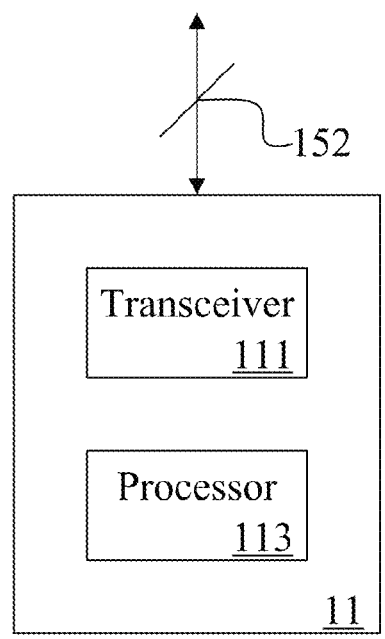
FIG. 1B is a schematic view of a network device of the first embodiment of the present invention.
Figure 1C:
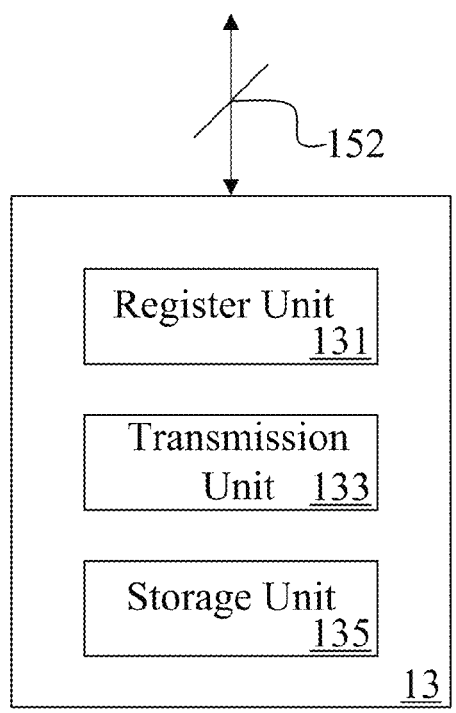
FIG. 1C is a schematic view of a core network of the first embodiment of the present invention.

Refer to FIG. 1A to FIG. 1C. FIG. 1A is a schematic view of a direct mode communication system 1 of a first embodiment of the present invention. The direct mode communication 1 comprises a network device 11 and a core network 13 which connects to a first mobile station 15a and a second mobile station 15b. FIG. 1B is a schematic view of the network device 11 of the first embodiment of the present invention. The network device 11 comprises a transceiver 111 and a processor 113. FIG. 1C is a schematic view of the core network 13 of the first embodiment of the present invention. The core network 13 comprises a register unit 131, a transmission unit 133 and a storage unit 135.

It shall be firstly appreciated that, the core network of the present invention may be a backend operating network composed of different hardware servers with different functions such as a server with register function, a server with transmitting function, a server with storing function or a server with processing function. However, this is not intended to limit the implementations of the present invention. Interactions between the network components will be further elucidated herein below.

Firstly, when monitoring the communications between the first mobile station 15a and the second mobile station 15b is needed for some security reasons, a legal user (for example, law enforcement officer) can request the court for authorizing lawful interception. Next, after being authorized, the user can initiate the lawful interception with the following steps by the network device 11.

Specifically, in order to inform the core network 13 of taking part in the direct mode communication, the processor 113 of the network device 11 registers to the core network 13 via the transceiver 111 for intercepting a communication 150 between the first mobile station 15a and the second mobile station 15b. In other words, the network device 11 notifies the core network 13 of intercepting. Accordingly, the register unit 131 is informed and registers the network device 11 for intercepting the communication 150.

After the network device 11 registering for taking part in the direct mode communication system 1, the transceiver 113 of the network device 11 starts to retrieve a communication data 152 by intercepting the communication 150.

Therefore, the network device 11 can obtain and monitor the information exchanged between the first mobile station 15a and the second mobile station 15b accordingly.

Then, the processor 113 of the network device 11 stores the communication data 152 in the core network 13 (or stores in network device 11 itself temporally if network device 11 has enough storage space) via the transceiver 111 for later use. In other words, the transmission unit 133 of the core network 13 receives the communication data 152 from the network device 11 and the storage unit 135 of the core network 13 stores the communication data 152 for later use. Accordingly, based on the first embodiment of the present invention, lawful interceptions in direct mode communication system 1 can be implemented.

Figure 2:
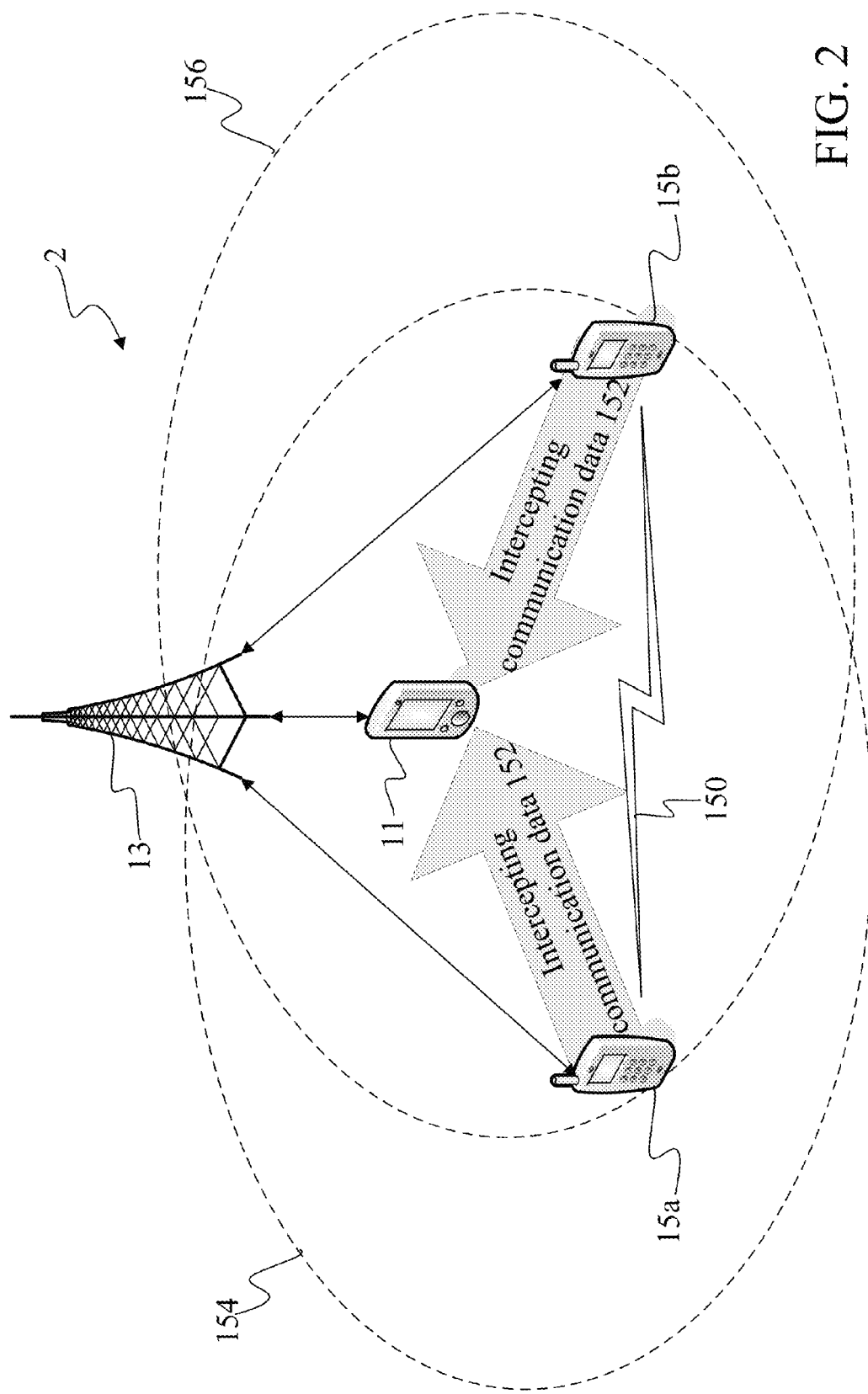
FIG. 2 is a schematic view of a direct mode communication system of a second embodiment of the present invention.

Referring to FIG. 2, there is shown a schematic view illustrating a direct mode communication system 2 of a second embodiment of the present invention. It shall be particularly appreciated that, the second embodiment has the same system architecture and the same network connection environment as the first embodiments, so the components bearing the same reference numerals also have the same functions and will not be further described herein.

Particularly, the network device 11 is within a first communicating coverage 154 of the first mobile station 15a and a second communicating coverage 156 of the second mobile station 15b at the same time. Accordingly, the transceiver 111 of the network device 11 connects to the first mobile station 15a and the second mobile station 15b at the same time, and receives the communication data 152 by intercepting the communication 150 directly from both of the first mobile station 15a and the second mobile station 15b.

However, it should be noted that, if the network device 11 is not within the first communicating coverage 154 of the first mobile station 15a or the second communicating coverage 156 of the second mobile station 15b, communication powers of the first mobile station 15a and the second mobile station 15b should be adjusted.

Figure 3B:
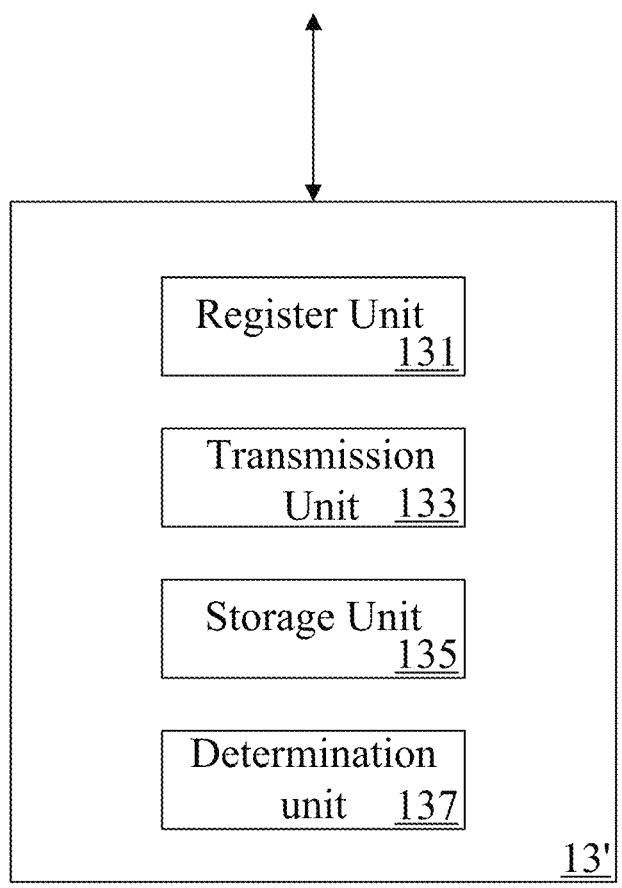
FIG. 3B is a schematic view of a core network of the third embodiment of the present invention.

Please refer to FIG. 3A and FIG. 3B. FIG. 3A is a schematic view of a direct mode communication system 3 of a third embodiment of the present invention, and FIG. 3B is a schematic view of a core network 13' of the third embodiment of the present invention. It shall be particularly noted that, the hardware structure and the network connection environment of the third embodiment are similar to those of the second embodiment, so components bearing the same reference numerals have the same functions and will not be further described herein. The third embodiment differs from the second embodiment in that, the core network 13' further comprises a determination unit 137.

Specifically, the determination unit 137 of the core network 13' is used for determining whether the network device 11 is within communicating coverage 154', 156' of the first mobile station 15a and the second mobile station 15b. Then, when the determination unit 137 of the core network 13' determines that the network device 11 is not within the communicating coverage 154' of the first mobile station 15a or the communicating coverage 156' of the second mobile station 15b, the transmission unit 133 further transmits power adjustment signals 130a and 130b to the first mobile station 15a and the second mobile station 15b respectively for secretly adjusting communication powers of the first mobile station 15a and the second mobile station 15b.

Accordingly, the network device 11 is capable of connecting to the first mobile station 15a and the second mobile station 15b at the same time, and the transceiver 111 is capable of receiving communication data by intercepting a communication between the first mobile station 15a and the second mobile station 15b directly from the first mobile station 15a and the second mobile station 15b.

Figure 4:
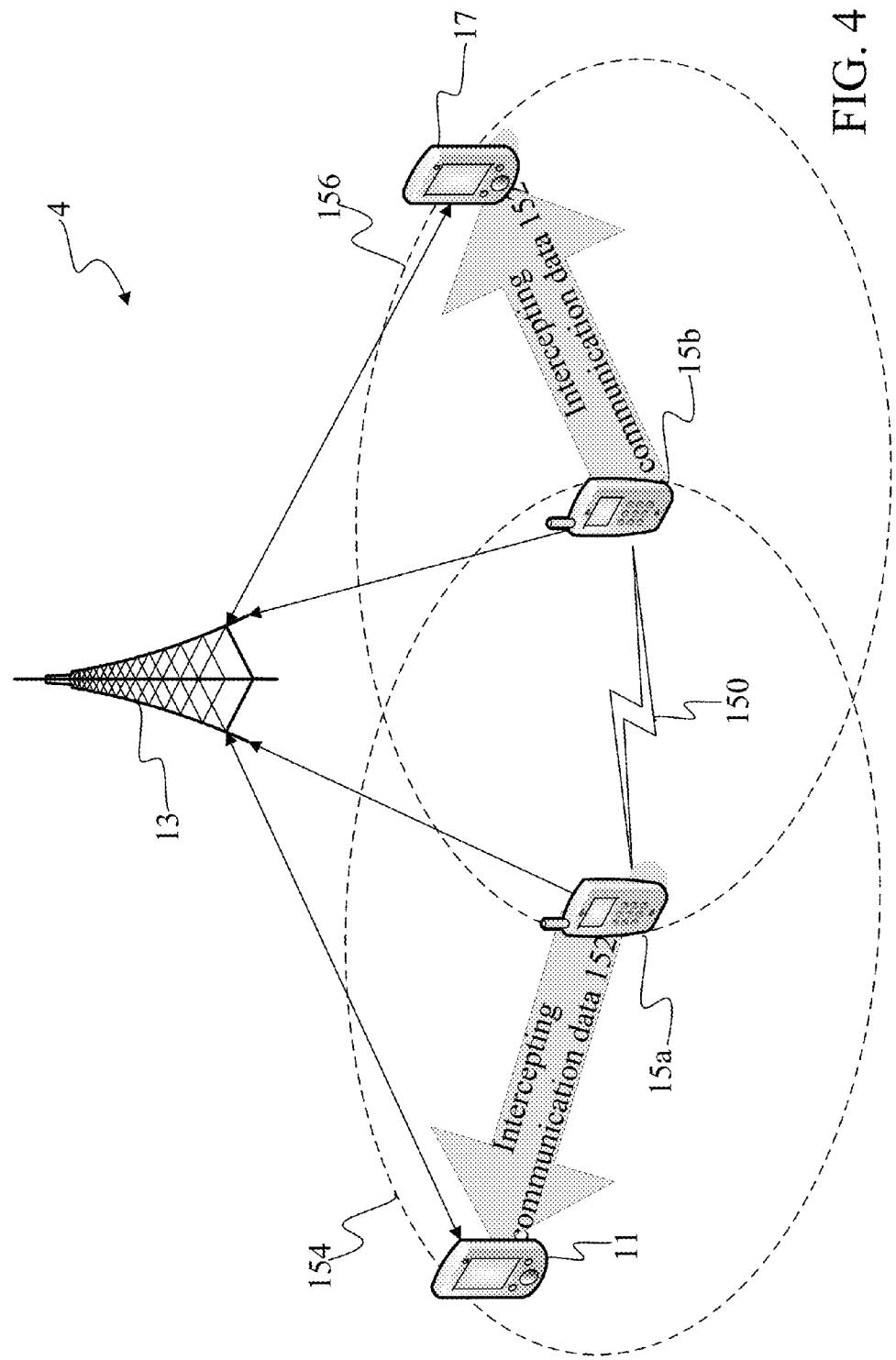
FIG. 4 is a schematic view of a direct mode communication system of a fourth embodiment of the present invention.

Referring to FIG. 4, there is shown a schematic view illustrating a direct mode communication system 4 of a fourth embodiment of the present invention. It shall be particularly appreciated that, the fourth embodiment has the same system architecture and the same network connection environment as the aforesaid embodiments, so the components bearing the same reference numerals also have the same functions and will not be further described herein. However, the fourth embodiment differs from the aforesaid embodiments in that: the network device 11 is only within the communicating coverage 154 of the first mobile station 15a, so a network device 17 (comprising the same components as the network device 11) is further introduced into the direct mode communication system 4 for intercepting the data transmitted from the second mobile station 15b.

Particularly, when the network device 11 is only within the communicating coverage 154 of the first mobile station 15a, the transceiver 111 of the network device 11 can only connects the first mobile station 15a and intercepts the communication data 152 of the first mobile station 15a. Accordingly, the network device 17 is introduced for connecting the second mobile station 15b and intercepts the communication data 152 of the second mobile station 15b. Therefore, the intercepting data of the communication 150 are more complete.

Furthermore, in other embodiment, the first mobile station 15a can be one member of a mobile station group, and the network device 11 can obtain partial communicating information of the mobile station group directly from the first mobile station 15a since the network device 11 only connects to the first mobile station 15a.

It should also be noted that, in the fourth embodiment, if the network device 11 is not within the first communicating coverage 154 of the first mobile station 15a, or network device 17 is not within the second communicating coverage 156 of the second mobile station 15b, communication powers of the first mobile station 15a and the second mobile station 15b should be adjusted via extra determination units as described in the third embodiment. Therefore, the detail of power adjustment will not be further described herein.

Figure 5:
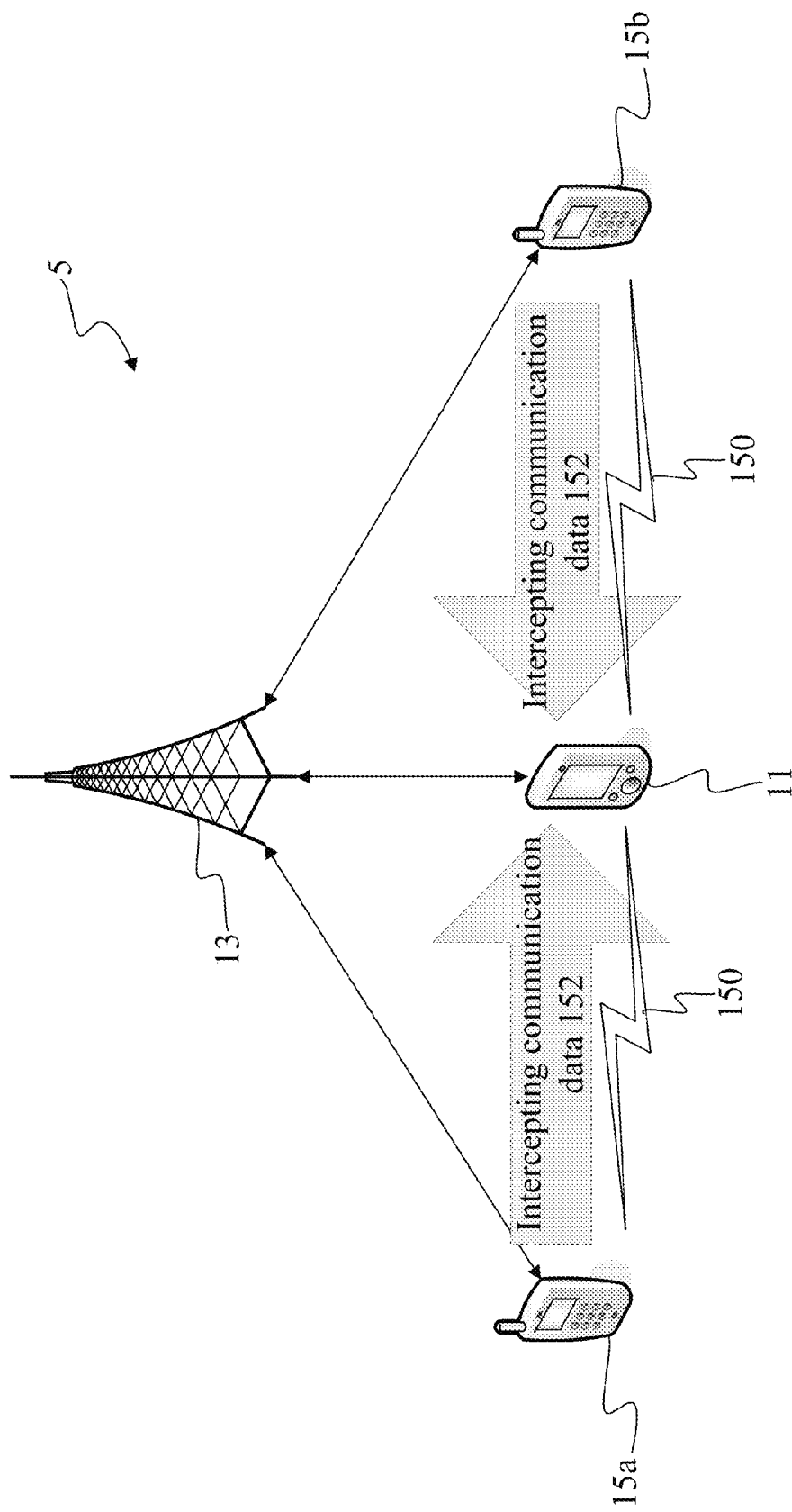
FIG. 5 is a schematic view of a direct mode communication system of a fifth embodiment of the present invention.

Referring to FIG. 5, there is shown a schematic view illustrating a direct mode communication system 5 of a fifth embodiment of the present invention. It shall be particularly appreciated that, the fifth embodiment has the same system architecture and the same network connection environment as the first embodiments, so the components bearing the same reference numerals also have the same functions and will not be further described herein.

Particularly, in the fifth embodiment, the network device 11 is a relay station, and the first mobile station 15a communicates with the second mobile station 15b via the network device 11. Accordingly, the transceiver 111 of the network device 11 is capable of retrieving the communication data 152 by intercepting the communication 150 while relaying the communication data 152 between the first mobile station 15a and the second mobile station 15b.

Figure 6:
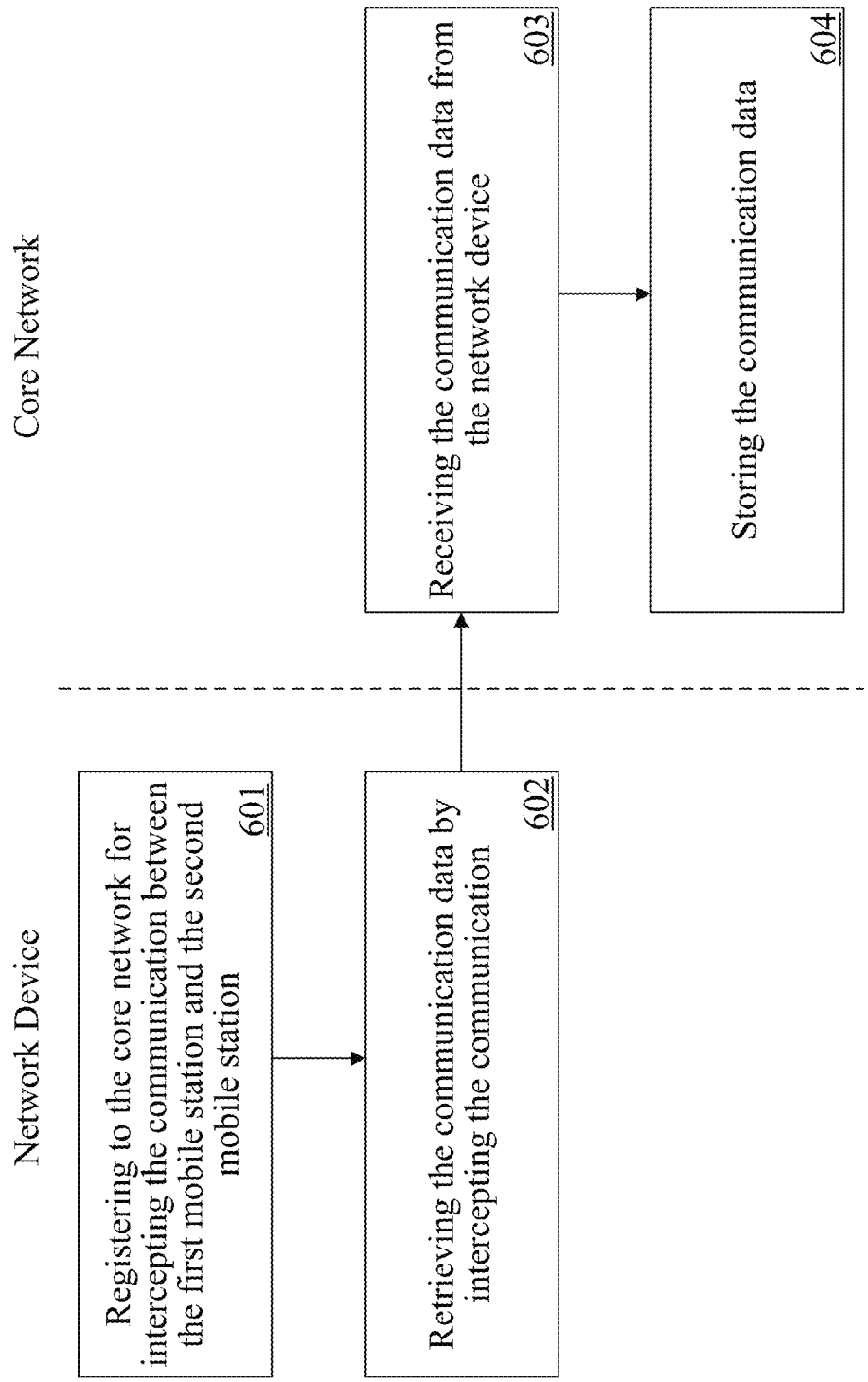
FIG. 6 is a flowchart diagram of a lawful interception method of a sixth embodiment of the present invention.

A sixth embodiment of the present invention is a lawful interception method. A flowchart diagram of which is shown in FIG. 6. The lawful interception method of the sixth embodiment is for use in a direct mode communication system (e.g., the direct mode communication system 1 of the first embodiment). The direct mode communication system further comprises a core network. A first mobile station and a second mobile station connect to the core network respectively. Steps of the sixth embodiment are detailed as follows.

Firstly, step 601 is executed to enable the network device to register to the core network for intercepting a communication between the first mobile station and the second mobile station. Then, step 602 is executed to enable the network device to retrieve a communication data by intercepting the communication. Next, the network device stores the communication data in the core network, so step 603 is executed to enable the core network to receive the communication data from the network device. Final, step 604 is executed to enable the core network to store the communication data.

Figure 7:
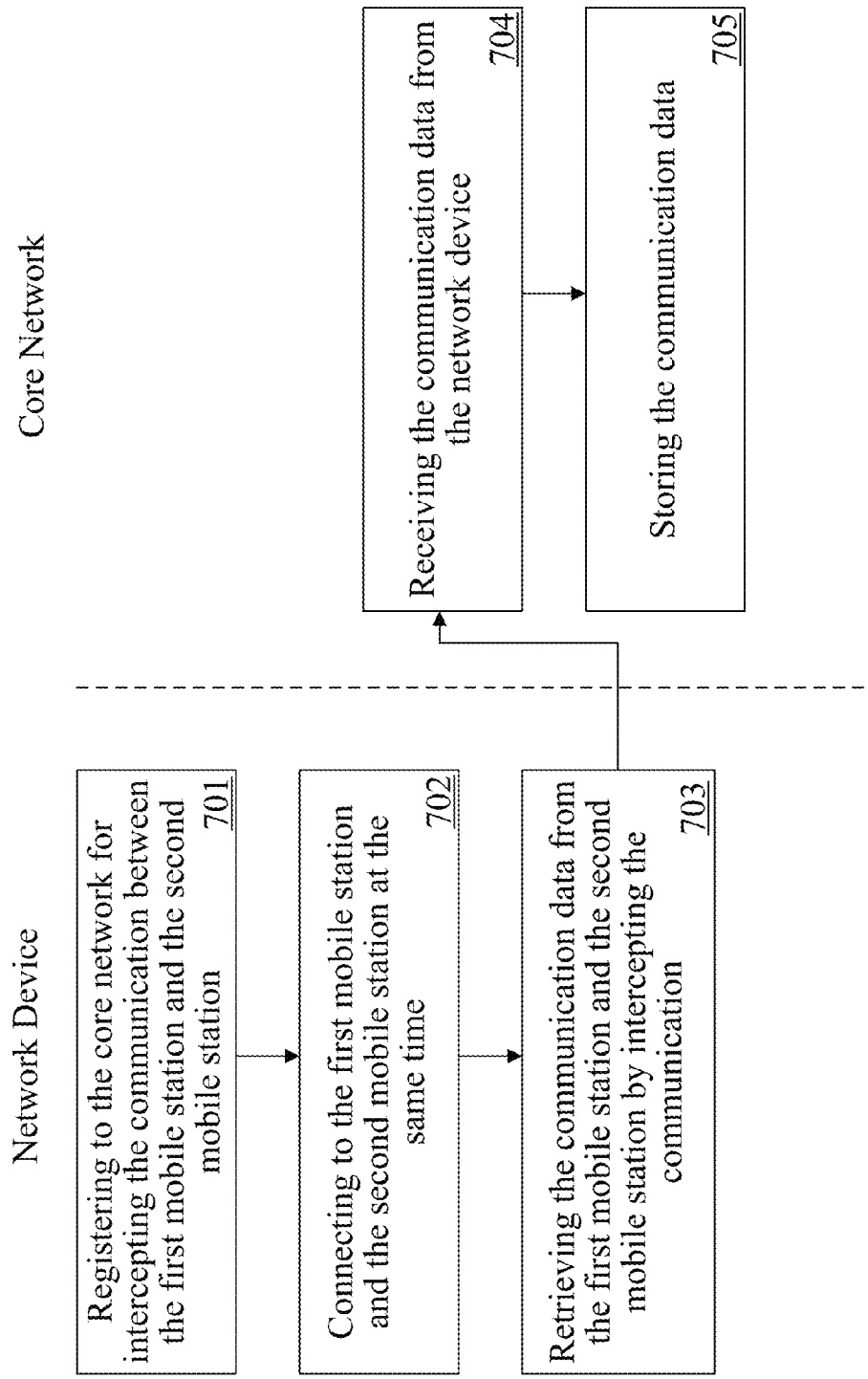
FIG. 7 is a flowchart diagram of a lawful interception method of a seventh embodiment of the present invention.

A seventh embodiment of the present invention is a lawful interception method. A flowchart diagram of which is shown in FIG. 7. The lawful interception method of the seventh embodiment is for use in a direct mode communication system (e.g., the direct mode communication system 2 of the second embodiment). The direct mode communication system further comprises a core network. A first mobile station and a second mobile station connect to the core network respectively. Steps of the seventh embodiment are detailed as follows.

Firstly, step 701 is executed to enable the network device to register to the core network for intercepting a communication between the first mobile station and the second mobile station. Then, step 702 is executed to enable the network device to connect to the first mobile station and the second mobile station at the same time. Step 703 is executed to enable the network device to retrieve the communication data from the first mobile station and the second mobile station by intercepting the communication. Next, the network device stores the communication data in the core network, so step 704 is executed to enable the core network to receive the communication data from the network device. Final, step 705 is executed to enable the core network to store the communication data.

Figure 8:
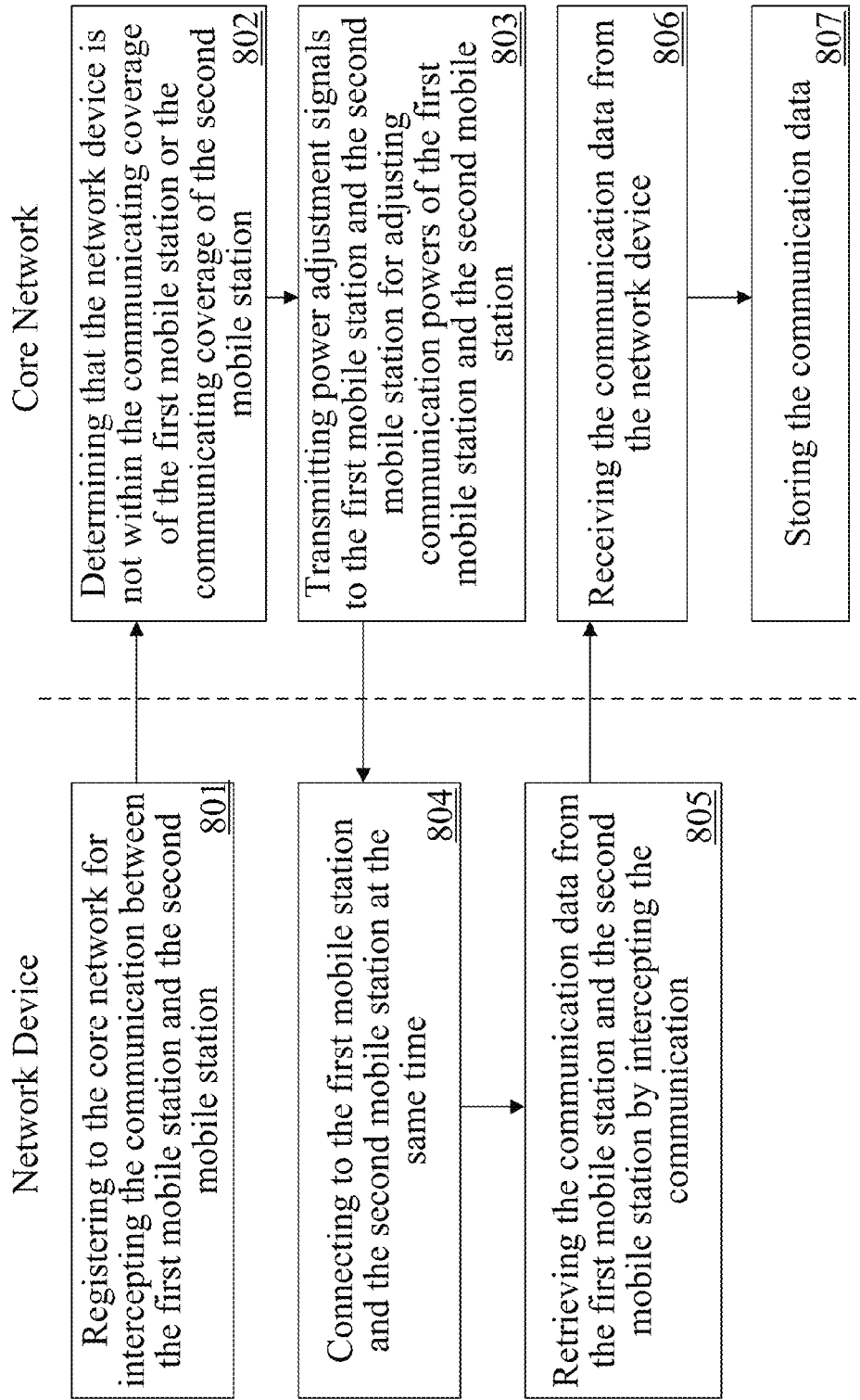
FIG. 8 is a flowchart diagram of a lawful interception method of an eighth embodiment of the present invention.

An eighth embodiment of the present invention is a lawful interception method. A flowchart diagram of which is shown in FIG. 8. The lawful interception method of the seventh embodiment is for use in a direct mode communication system (e.g., the direct mode communication system 3 of the second embodiment). The direct mode communication system further comprises a core network. A first mobile station and a second mobile station connect to the core network respectively. Steps of the eighth embodiment are detailed as follows.

Firstly, step 801 is executed to enable the network device to register to the core network for intercepting a communication between the first mobile station and the second mobile station. Step 802 is executed to enable the core network to determine that the network device is not within a communicating coverage of the first mobile station or a communicating coverage of the second mobile station. Next, step 803 is executed to enable the core network to transmit power adjustment signals to the first mobile station and the second mobile station for adjusting communication powers of the first mobile station and the second mobile station.

Then, step 804 is executed to enable the network device to connect to the first mobile station and the second mobile station at the same time. Step 805 is executed to enable the network device to retrieve the communication data from the first mobile station and the second mobile station by intercepting the communication. Next, the network device stores the communication data in the core network, so step 806 is executed to enable the core network to receive the communication data from the network device. Final, step 807 is executed to enable the core network to store the communication data.

Figure 9:
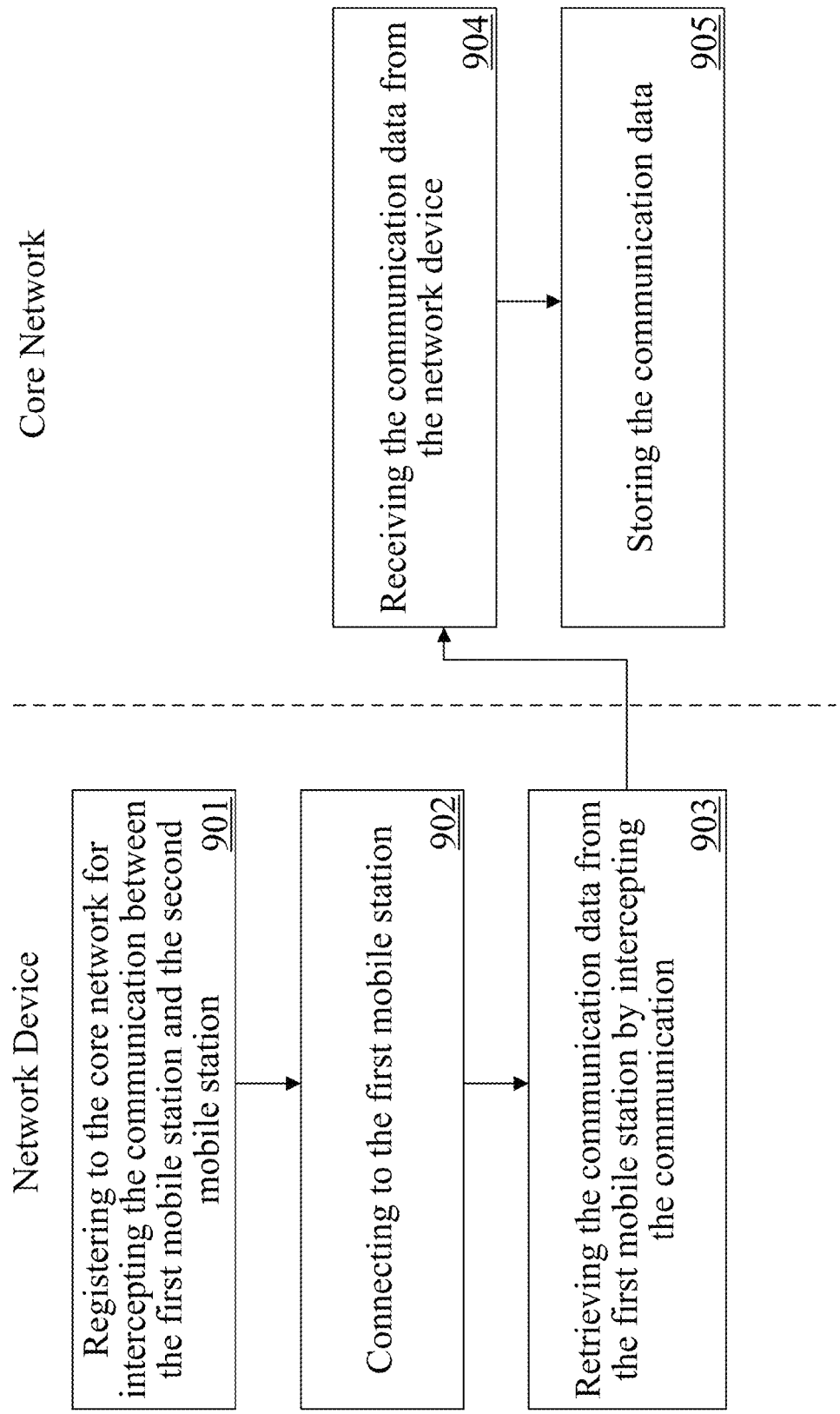
FIG. 9 is a flowchart diagram of a lawful interception method of a ninth embodiment of the present invention.

A ninth embodiment of the present invention is a lawful interception method. A flowchart diagram of which is shown in FIG. 9. The lawful interception method of the ninth embodiment is for use in a direct mode communication system (e.g., the direct mode communication system 4 of the fourth embodiment). The direct mode communication system further comprises a core network. A first mobile station and a second mobile station connect to the core network respectively. Steps of the ninth embodiment are detailed as follows.

Firstly, step 901 is executed to enable the network device to register to the core network for intercepting a communication between the first mobile station and the second mobile station. Then, step 902 is executed to enable the network device to connect to the first mobile station only. Step 903 is executed to enable the network device to retrieve the communication data from the first mobile station by intercepting the communication. Next, the network device stores the communication data in the core network, so step 904 is executed to enable the core network to receive the communication data from the network device. Final, step 905 is executed to enable the core network to store the communication data.

Similarly, it should be noted that in the ninth embodiment, if the network device is not within the first communicating coverage of the first mobile station, communication power of the first mobile station should be adjusted as described in the eighth embodiment. Therefore, the detail of power adjustment will not be further described herein.

Figure 10:
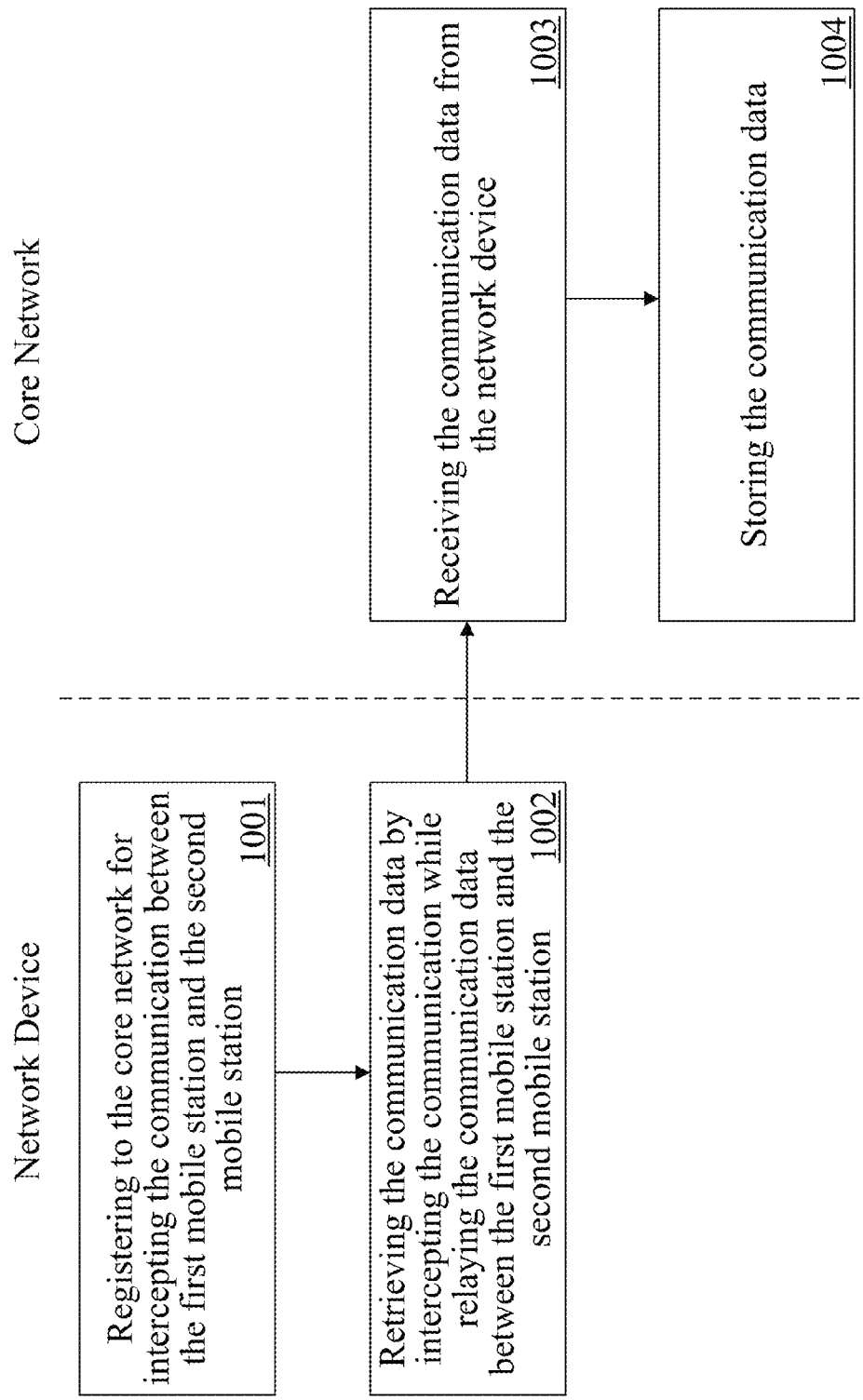
FIG. 10 is a flowchart diagram of a lawful interception method of a tenth embodiment of the present invention.

A tenth embodiment of the present invention is a lawful interception method. A flowchart diagram of which is shown in FIG. 10. The lawful interception method of the tenth embodiment is for use in a direct mode communication system (e.g., the direct mode communication system 5 of the first embodiment). The direct mode communication system further comprises a core network. A first mobile station and a second mobile station connect to the core network respectively. The first mobile station communicates with the second station via the network device. Steps of the tenth embodiment are detailed as follows.

Firstly, step 1001 is executed to enable the network device to register to the core network for intercepting a communication between the first mobile station and the second mobile station. Then, step 1002 is executed to enable the network device to retrieve a communication data by intercepting the communication while relaying the communication data between the first mobile station and the second mobile station. Next, the network device stores the communication data in the core network, so step 1003 is executed to enable the core network to receive the communication data from the network device. Final, step 1004 is executed to enable the core network to store the communication data.

Figure 11A:
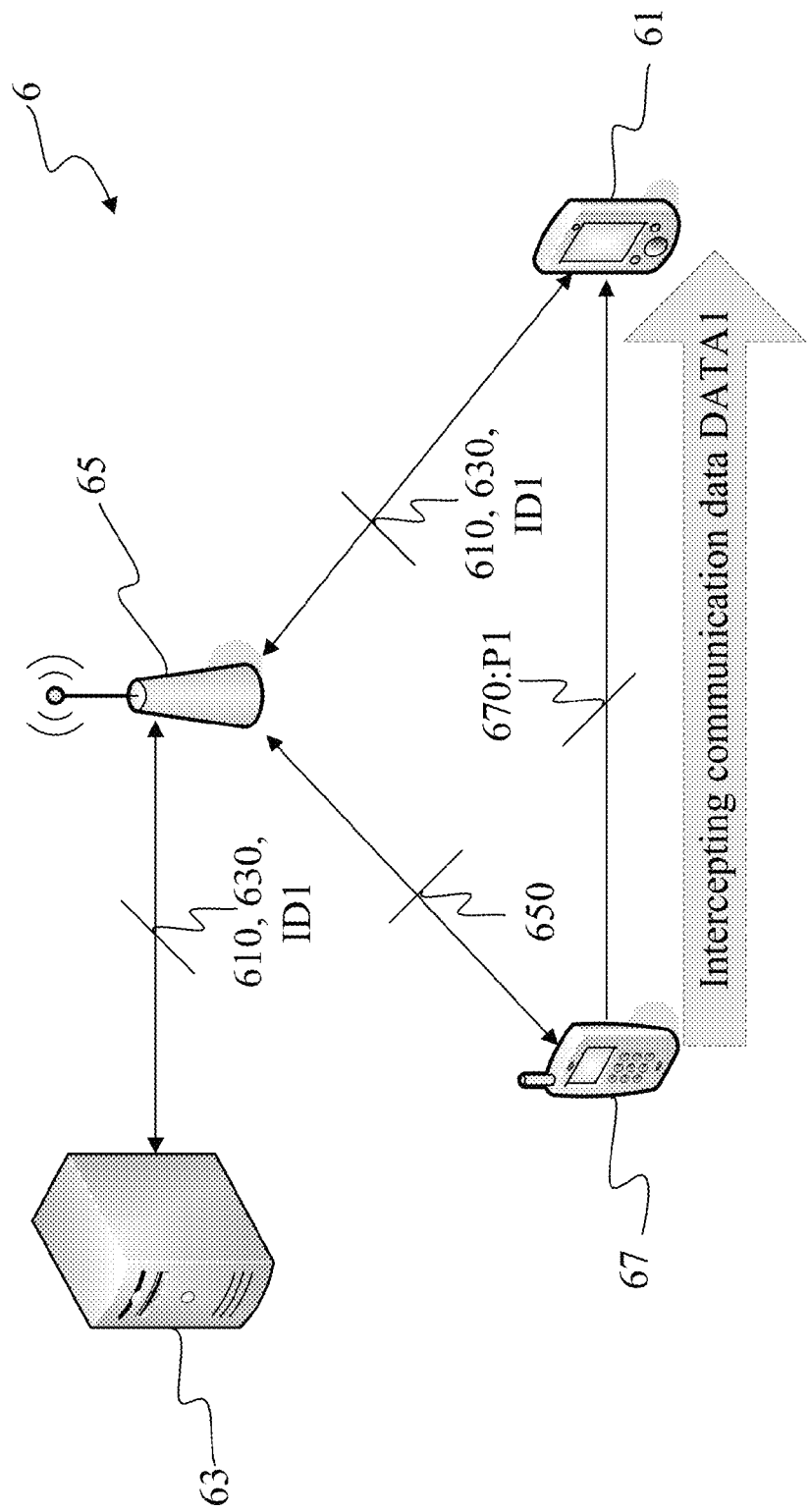
FIG. 11A is a schematic view of a 3GPP direct mode communication system of an eleventh embodiment of the present invention.
Figure 11B:
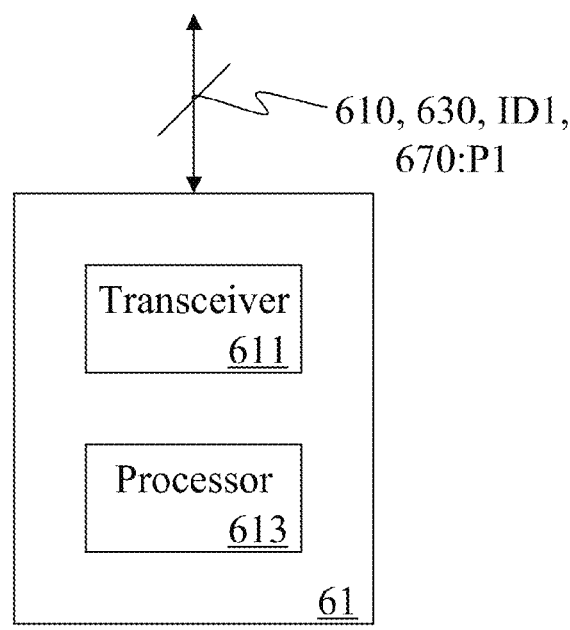
FIG. 11B is a schematic view of an intercepting user equipment of the eleventh embodiment of the present invention.
Figure 11C:
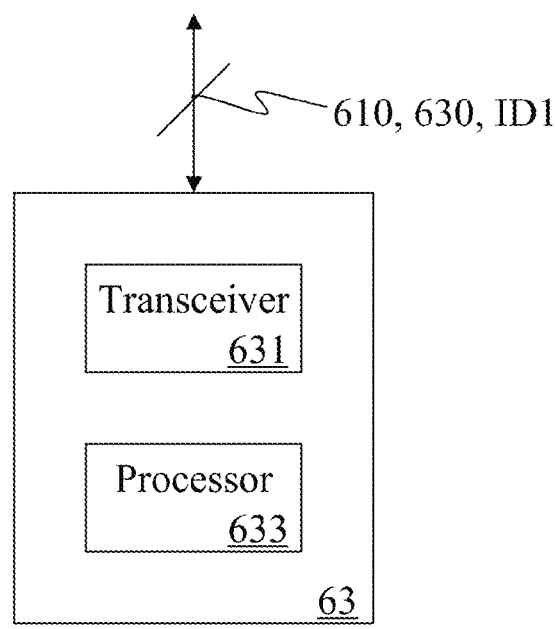
FIG. 11C is a schematic view of an administrating server of the eleventh embodiment of the present invention.

Refer to FIG. 11A to FIG. 11C. FIG. 11A is a schematic view of a 3GPP direct mode communication system 6 of an eleventh embodiment of the present invention. The 3GPP direct mode communication system 6 comprises an intercepting user equipment 61, an administrating server 63 and an eNB 65. A first user equipment 67 connects with the administrating server 63 via the eNB 65.

FIG. 11B is a schematic view of the intercepting user equipment 61 of the eleventh embodiment of the present invention. The intercepting user equipment 61 comprises a transceiver 611 and a processor 613. FIG. 11C is a schematic view of the administrating server 63 of the eleventh embodiment of the present invention. The administrating server 63 comprises a transceiver 631 and a processor 633.

It shall be firstly appreciated that, the administrating server of the present invention may be a backend operating server which has different functions such as register function, transmitting function, storing function, locating function (e.g., Proximity-based services function in 3GPP network) and administrating function (e.g., Administration function in 3GPP network). However, this is not intended to limit the implementations of the present invention. Interactions between the network components will be further elucidated herein below.

Particularly, when monitoring the communications of the first mobile station 67 is needed for some security reasons, a legal user (for example, law enforcement officer) can request the court for authorizing lawful interception. Next, after being authorized, the lawful interception can be achieved as follows.

Firstly, the processor 613 of the intercepting user equipment 61 registers to the administrating server 63 by the transceiver 611 via the eNB 65 for lawful interception. Then, the processor 633 of the administrating server 63 authorizes the intercepting user equipment 61 by the transceiver 631 to perform lawful interception if the intercepting user equipment 61 is legal. After registering for taking part in the 3GPP direct mode communication system 6, the intercepting user equipment 61 is ready for lawful interception.

In the eleventh embodiment, when the first user equipment 67 with a first identification ID1 is needed to be monitored, the administrating server 63 determines a lawful user equipment from plurality of lawful intercepting user equipment (not shown) for intercepting the first user equipment 67. Since the administrating server 63 has the ProSe function which are used for locating the user equipment, the administrating server 63 is capable of determining a user equipment, which is the intercepting user equipment 61 in the eleventh embodiment, closer to the first user equipment 67 for intercepting the first user equipment 67.

Next, the processor 633 of the administrating server 63 initiates the interception by transmitting a positive interception message 630 to the intercepting user equipment 61 by the transceiver 631 via the eNB 65 while the positive interception message 630 comprises the first identification ID1 of the first user equipment 67. In other words, the processor 613 of the intercepting user equipment 61 receives the positive interception message 630 from the administrating server 63 by the transceiver 611 via the eNB 65.

Since the intercepting user equipment 61 is notified of intercepting the first user equipment 67, the intercepting user equipment 61 tries to reach the first user equipment 67. More specifically, in the eleventh embodiment, the processor 613 of the intercepting user equipment 61 receives a first signal 670 from the first user equipment 67 by the transceiver 611 based on the first identification ID1. The first signal may comprise of control plane signal and/or user plane signal, where the control plane signal may be synchronization signal or reference signal, and the user plane signal is a data transmitted on the dedicated and/or shared resource blocks.

Then, the processor 613 of the intercepting user equipment 61 determines whether a first power measurement P1 of the first signal 670 exceeds a threshold (not shown) or not. The power measurement may be Signal to Interference plus Noise Ratio (SINR), Received Signal Strength Indicator (RSSI), Reference Signal Received Power (RSRP), or Reference Signal Received Quality (RSRQ), and etc. If the first power measurement P1 of the first signal 670 exceeds the threshold, it means that the intercepting user equipment 61 is capable of correctly receiving communication data DATA1 from the first user equipment 67. Accordingly, the intercepting user equipment 61 may intercept the communication data DATA1 of the first user equipment 67 based on the first user identification ID1 directly.

On the other hand, if the first power measurement P1 of the first signal 670 does not exceed the threshold, it means that the intercepting user equipment 61 may not correctly receive communication data DATA1 from the first user equipment 67 since the power received from the first user equipment 67 is not good enough for the first user equipment 67 to reach the intercepting user equipment 61. Therefore, the transmitting power of the first user equipment 67 should be enhanced.

Accordingly, the processor 613 of the intercepting user equipment 61 transmits a power adjustment request 610 to the administrating server 63 by the transceiver 611 via the eNB 65 based on the determination of that the first power measurement P1 does not exceed the threshold so that the administrating server 63 notifies the eNB 65 of transmitting a power adjustment command 650 to the first user equipment 67 for adjusting transmitting power of the first user equipment 67. Afterwards, in the eleventh embodiment, the processor 613 of the intercepting user equipment 61 is capable of correctly intercepting the communication data DATA1 from the first user equipment 67 based on the first user identification ID1 by the transceiver 611.

It should be noted that, in the eleventh embodiment, if it is continuously determined that the power received from the first user equipment 67 does not exceed the threshold, the power adjustment scheme described above repeats until the power received from the first user equipment 67 exceeds the threshold.

Figure 12:
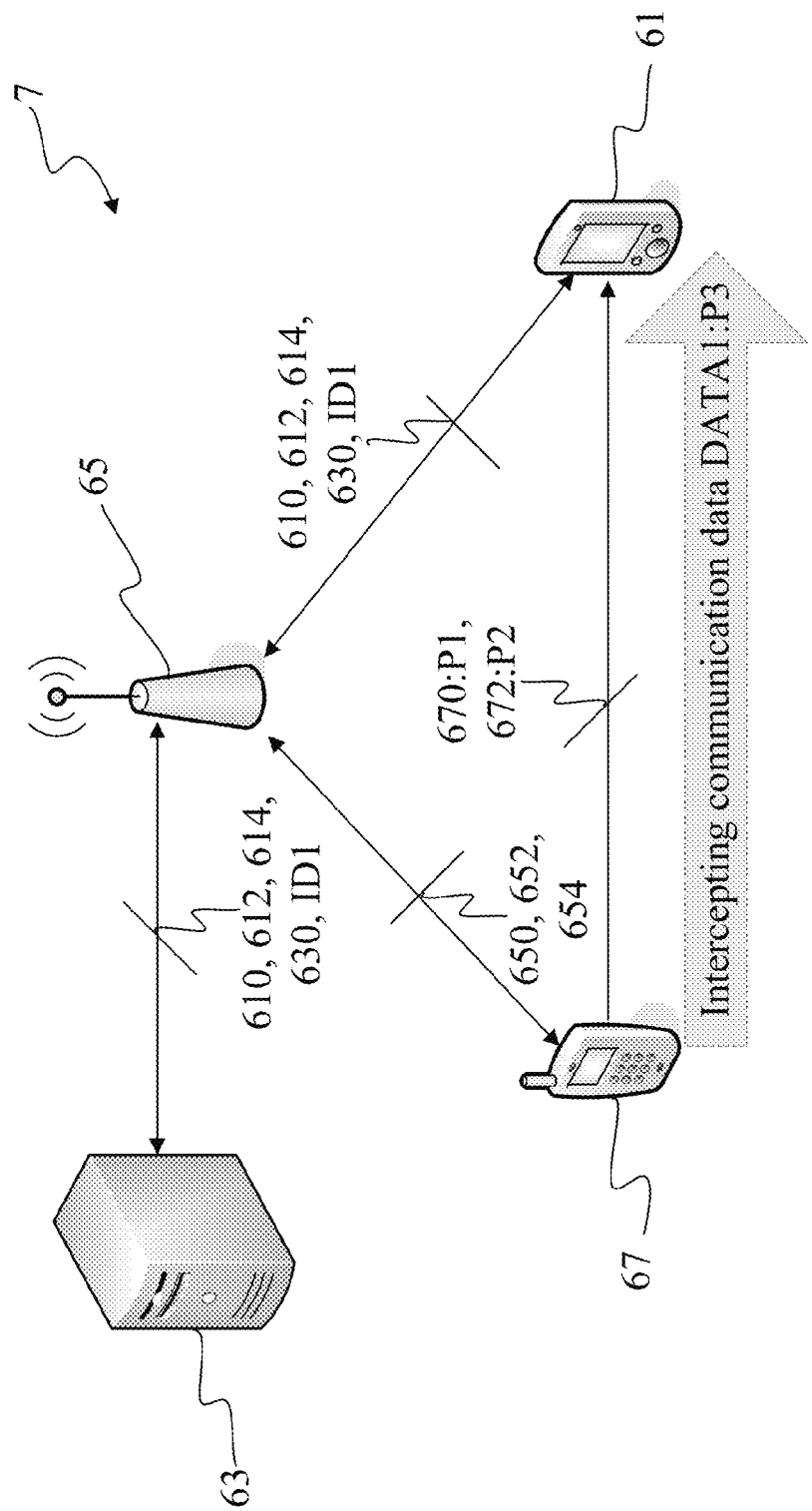
FIG. 12 is a schematic view of a 3GPP direct mode communication system of a twelfth embodiment of the present invention.

Referring to FIG. 12, there is shown a schematic view illustrating a 3GPP direct mode communication system 7 of a twelfth embodiment of the present invention. It shall be particularly appreciated that, the twelfth embodiment has the same system architecture and the same network connection environment as the eleventh embodiments, so the components bearing the same reference numerals also have the same functions and will not be further described herein. The twelfth embodiment differs from the eleventh embodiment is that, not only the power measurement of the signals but also the power measurement of the communication data can be used for comparing with the threshold.

Specifically, after intercepting the communication data DATA1, the processor 613 of the intercepting user equipment 61 further determines whether the power received from the first user equipment 67 exceeds the threshold or not in different implementations. In one implementation, the processor 613 of the intercepting user equipment 61 further receives a second signal 672 from the first user equipment 67 by the transceiver 611 based on the first identification ID1.

Then, the processor 613 of the intercepting user equipment 61 further determines whether a second power measurement P2 of the second signal 672 exceeds the threshold or not. If the second power measurement P2 of the second signal 672 exceeds the threshold, it means that the intercepting user equipment 61 is capable of continuously and correctly intercepting the communication data DATA1 from the first user equipment 67.

On the other hand, if the second power measurement P2 of the second signal 672 does not exceed the threshold, it means that the intercepting user equipment 61 may not correctly receive communication data DATA1 from the first user equipment 67 since the power received from the first user equipment 67 is still not good enough. Therefore, the transmitting power of the first user equipment 67 should be enhanced.

Accordingly, the processor 613 of the intercepting user equipment 61 transmits another power adjustment request 612 to the administrating server 63 by the transceiver 611 via the eNB 65 based on the determination of that the second power measurement P2 does not exceed the threshold so that the administrating server 63 notifies the eNB 65 of transmitting another power adjustment command 652 to the first user equipment 67 for adjusting transmitting power of the first user equipment 67. Afterwards, in the twelfth embodiment, the processor 613 of the intercepting user equipment 61 is capable of continuously and correctly intercepting the communication data DATA1 from the first user equipment 67 based on the first user identification ID1 by the transceiver 611.

In another implantation, the processor 613 of the intercepting user equipment 61 directly determines whether a power measurement P3 of the communication data DATA1 exceeds the threshold or not. If the power measurement P3 of the communication data DATA1 exceeds the threshold, it means that the intercepting user equipment 61 continuously and correctly receives the communication data DATA1 from the first user equipment 67. Accordingly, the intercepting user equipment 61 continues to intercept the communication data DATA1 of the first user equipment 67 based on the first user identification ID1.

On the other hand, if the power measurement P3 of the communication data DATA1 does not exceed the threshold, it means that the intercepting user equipment 61 may not continuously and correctly receive the communication data DATA1 from the first user equipment 67 since the power received from the first user equipment 67 is still not good enough. Therefore, the transmitting power of the first user equipment 67 should be enhanced again.

Accordingly, the processor 613 of the intercepting user equipment 61 transmits another power adjustment request 614 to the administrating server 63 by the transceiver 611 via the eNB 65 based on the determination of that the power measurement P3 does not exceed the threshold so that the administrating server 63 notifies the eNB 65 of transmitting another power adjustment command 654 to the first user equipment 67 for adjusting transmitting power of the first user equipment 67. Afterwards, in the twelfth embodiment, the processor 613 of the intercepting user equipment 61 is capable of continuously and correctly intercepting the communication data DATA1 from the first user equipment 67 based on the first user identification ID1 by the transceiver 611.

Figure 13:
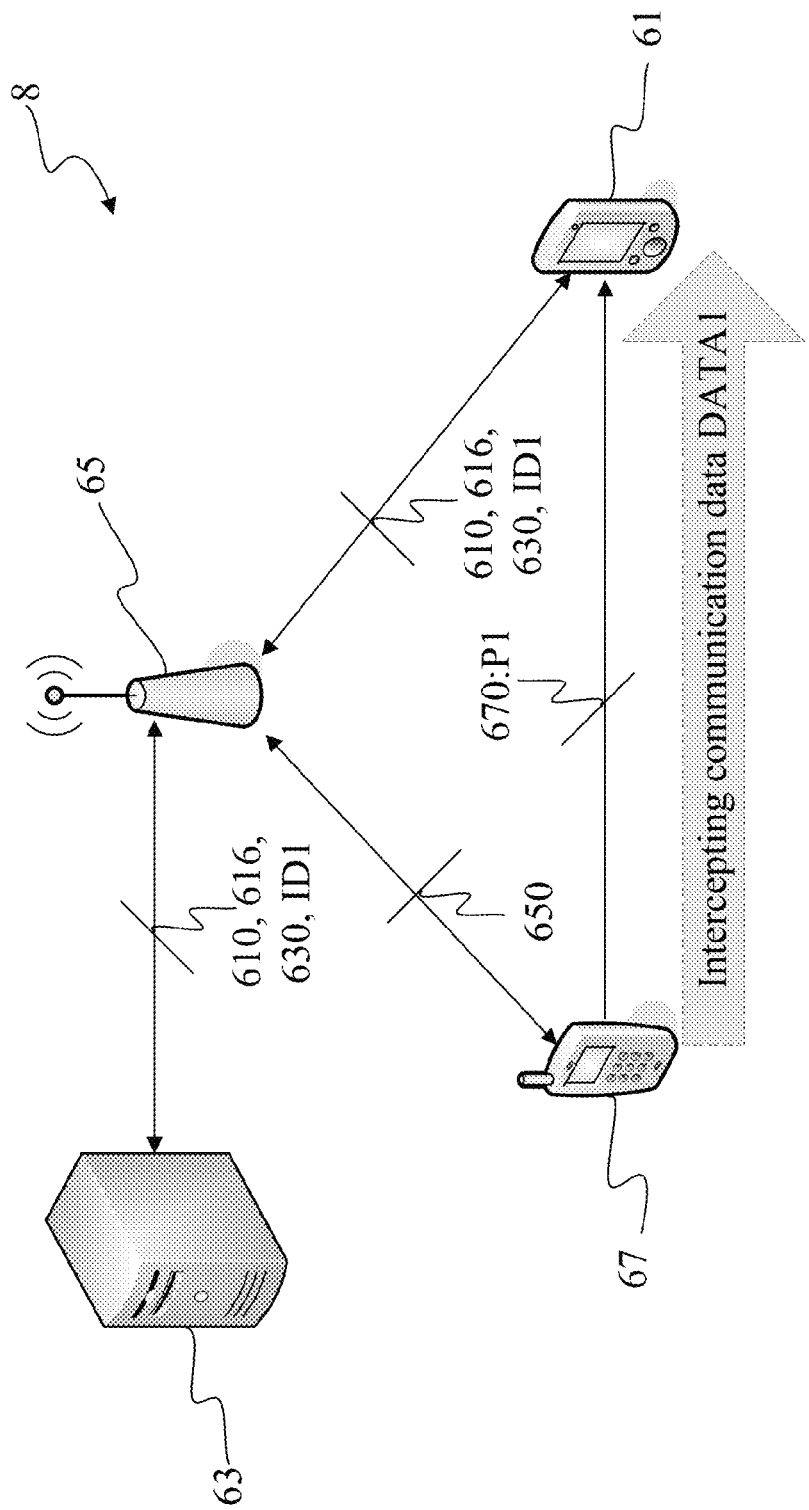
FIG. 13 is a schematic view of a 3GPP direct mode communication system of a thirteenth embodiment of the present invention.

Referring to FIG. 13, there is shown a schematic view illustrating a 3GPP direct mode communication system 8 of a thirteenth embodiment of the present invention. It shall be particularly appreciated that, the thirteenth embodiment has the same system architecture and the same network connection environment as the eleventh or twelfth embodiments, so the components bearing the same reference numerals also have the same functions and will not be further described herein. The thirteenth embodiment differs from the above embodiments is that the lawful interception can be initiated by the intercepting user equipment.

Similarly, the processor 613 of the intercepting user equipment 61 registers to the administrating server 63 by the transceiver 611 via the eNB 65 for lawful interception. Then, the processor 633 of the administrating server 63 authorizes the intercepting user equipment 61 by the transceiver 631 to perform lawful interception if the intercepting user equipment 61 is legal. After registering for taking part in the 3GPP direct mode communication system 8, the intercepting user equipment 61 is ready for lawful interception.

In the thirteenth embodiment, when the intercepting user equipment 61 needs to monitor a nearby user, the processor 613 of the intercepting user equipment 61 transmits an interception request message 616 to the administrating server 63 by the transceiver 611 via the eNB 65 and the interception request message 616 comprises user data (not shown) about the user, such as user's name, user's phone number etc. Afterwards, the administrating server 63 is capable of identifying the first user equipment 67 based on the user data.

Accordingly, the processor 633 of the administrating server 63 transmits the positive interception message 630 to the intercepting user equipment 61 by the transceiver 631 via the eNB 65 while the positive interception message 630 comprises the first identification ID1 of the first user equipment 67. In other words, the processor 613 of the intercepting user equipment 61 receives the positive interception message 630 from the administrating server 63 by the transceiver 611 via the eNB 65.

Next, the intercepting user equipment 61 tries to reach the first user equipment 67 based on the first identification ID1. Similarly, in the thirteenth embodiment, the processor 613 of the intercepting user equipment 61 receives the first signal 670 from the first user equipment 67 by the transceiver 611 based on the first identification ID1.

Then, the processor 613 of the intercepting user equipment 61 determines whether the first power measurement P1 of the first signal 670 exceeds the threshold. If the first power measurement P1 of the first signal 670 exceeds the threshold, it means that the intercepting user equipment 61 is capable of correctly receiving the communication data DATA1 from the first user equipment 67. Accordingly, the intercepting user equipment 61 may intercept the communication data DATA1 of the first user equipment 67 based on the first user identification ID1 directly.

On the other hand, if the first power measurement P1 of the first signal 670 does not exceed the threshold, it means that the intercepting user equipment 61 may not correctly receive communication data DATA1 from the first user equipment 67 since the power received from the first user equipment 67 is not good enough for reaching the intercepting user equipment 61. Therefore, the transmitting power of the first user equipment 67 should be enhanced.

Accordingly, the processor 613 of the intercepting user equipment 61 transmits the power adjustment request 610 to the administrating server 63 by the transceiver 611 via the eNB 65 based on the determination of that the first power measurement P1 does not exceed the threshold so that the administrating server 63 notifies the eNB 65 of transmitting the power adjustment command 650 to the first user equipment 67 for adjusting transmitting power of the first user equipment 67. Afterwards, in the eleventh embodiment, the processor 613 of the intercepting user equipment 61 is capable of correctly intercepting the communication data DATA1 from the first user equipment 67 based on the first user identification ID1 by the transceiver 611.

Figure 14:
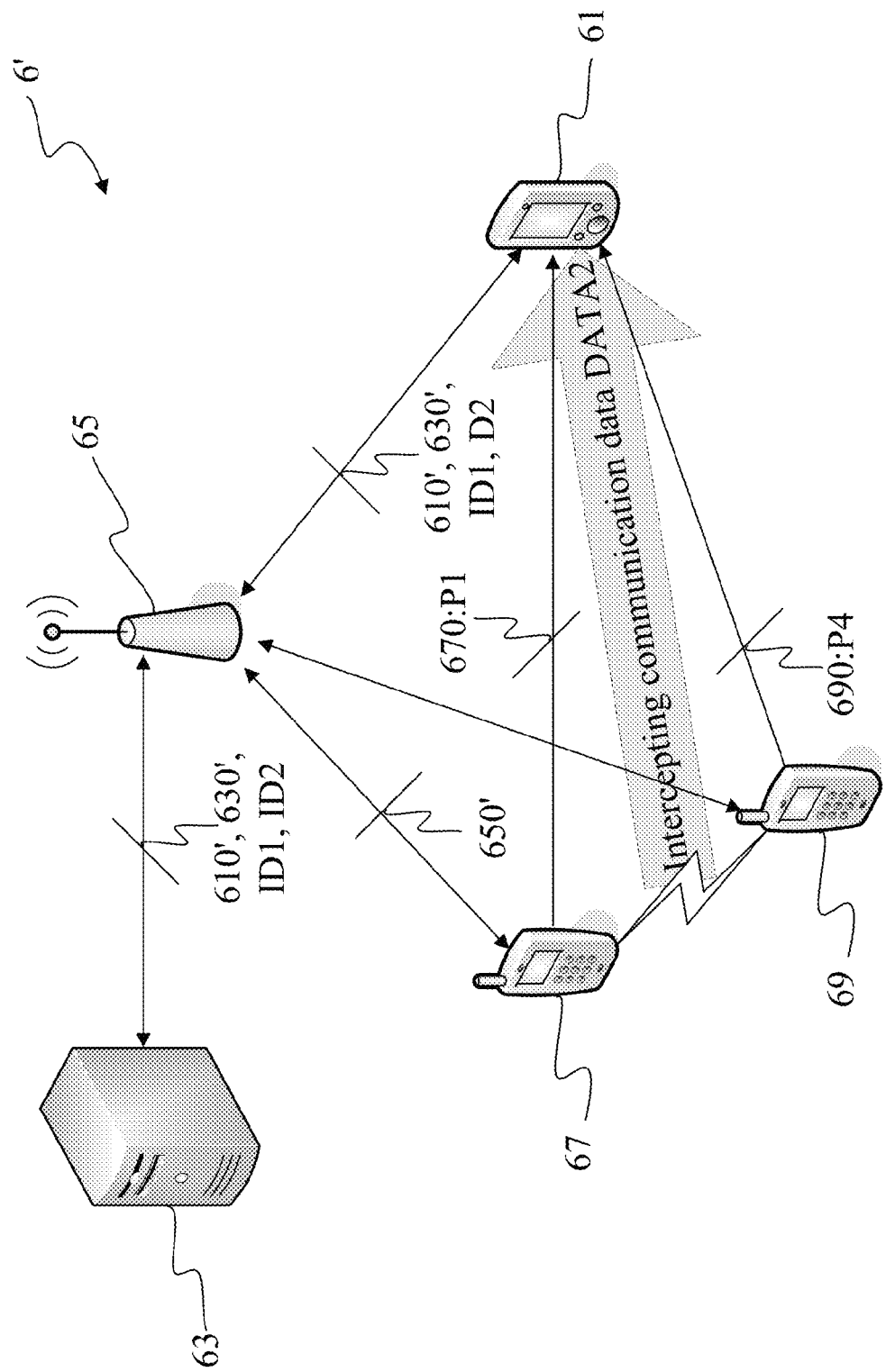
FIG. 14 is a schematic view of a 3GPP direct mode communication system of a fourteenth embodiment of the present invention.

Referring to FIG. 14, there is shown a schematic view illustrating a 3GPP direct mode communication system 6' of a fourteenth embodiment of the present invention. It shall be particularly appreciated that, the fourteenth embodiment has the same system architecture and the same network connection environment as the eleventh embodiments, so the components bearing the same reference numerals also have the same functions and will not be further described herein. The fourteenth embodiment differs from the eleventh embodiment is that there is one more user equipment for intercepting.

In the fourteenth embodiment, when a direct communication between the first user equipment 67 with the first identification ID1 and a second user equipment 69 with a second identification ID2 is needed to be monitored, the processor 633 of the administrating server 63 determines a lawful user equipment from plurality of lawful intercepting user equipment for intercepting the first user equipment 67 and the second user equipment 69.

Similarly, since the administrating server 63 has the ProSe function which are used for locating the user equipment, the administrating server 63 is capable of determining a user equipment, which is the intercepting user equipment 61 in the fourteenth embodiment, closest to the first user equipment 67 and the second user equipment 69 for intercepting the direct communication between the first user equipment 67 and the second user equipment 69.

Next, the processor 633 of the administrating server 63 initiates the interception by transmitting a positive interception message 630' to the intercepting user equipment 61 by the transceiver 631 via the eNB 65 while the positive interception message 630' comprises the first identification ID1 of the first user equipment 67 and the second identification ID2 of the second user equipment 69. In other words, the processor 613 of the intercepting user equipment 61 receives the positive interception message 630' from the administrating server 63 by the transceiver 611 via the eNB 65.

Since the intercepting user equipment 61 is notified of intercepting the direct communication between the first user equipment 67 and the second user equipment 69, the intercepting user equipment 61 tries to reach both of them. More specifically, in the twelfth embodiment, the processor 613 of the intercepting user equipment 61 receives the first signal 670 from the first user equipment 67 and a second signal 690 from the second user equipment 69 by the transceiver 611 based on the first identification ID1 and the second identification ID2.

Then, the processor 613 of the intercepting user equipment 61 determines whether the first power measurement P1 of the first signal 670 and a second power measurement P4 of the second signal 690 exceed the threshold or not. If the first power measurement P1 of the first signal 670 or the second power measurement P4 of the second signal 690 exceed the threshold, it means that the intercepting user equipment 61 is capable of correctly receiving communication data DATA2 between the first user equipment 67 and the second user equipment 69 from the first user equipment 67 or the second user equipment 69. Accordingly, the intercepting user equipment 61 may intercept the communication data DATA2 between the first user equipment 67 and the second user equipment 69 based on the first user identification ID1 or the second user identification ID2 directly.

On the other hand, if the first power measurement P1 of the first signal 670 does not exceed the threshold and the second power measurement P4 of the second signal 690 does not exceed the threshold, it means that the intercepting user equipment 61 may not correctly receive the communication data DATA2 from the first user equipment 67 and the second user equipment 69 since the powers received from the first user equipment 67 and the second user equipment 69 are not good enough for reaching the intercepting user equipment 61. Therefore, the transmitting powers of the first user equipment 67 and the second user equipment 69 should be enhanced.

Accordingly, the processor 613 of the intercepting user equipment 61 transmits a power adjustment request 610' to the administrating server 63 by the transceiver 611 via the eNB 65 based on the determination of that the first power measurement P1 does not exceed the threshold and the second power measurement P4 does not exceed the threshold so that the administrating server 63 notifies the eNB 65 of transmitting a power adjustment command 650' to the first user equipment 67 and the second user equipment 69 for adjusting transmitting powers of the first user equipment 67 and the second user equipment 69.

Afterwards, in the fourteenth embodiment, the processor 613 of the intercepting user equipment 61 is capable of correctly intercepting the communication data DATA2 from the first user equipment 67 based on the first user identification ID1 or from the second user equipment 69 based on the second user identification ID2 by the transceiver 611.

Figure 15:
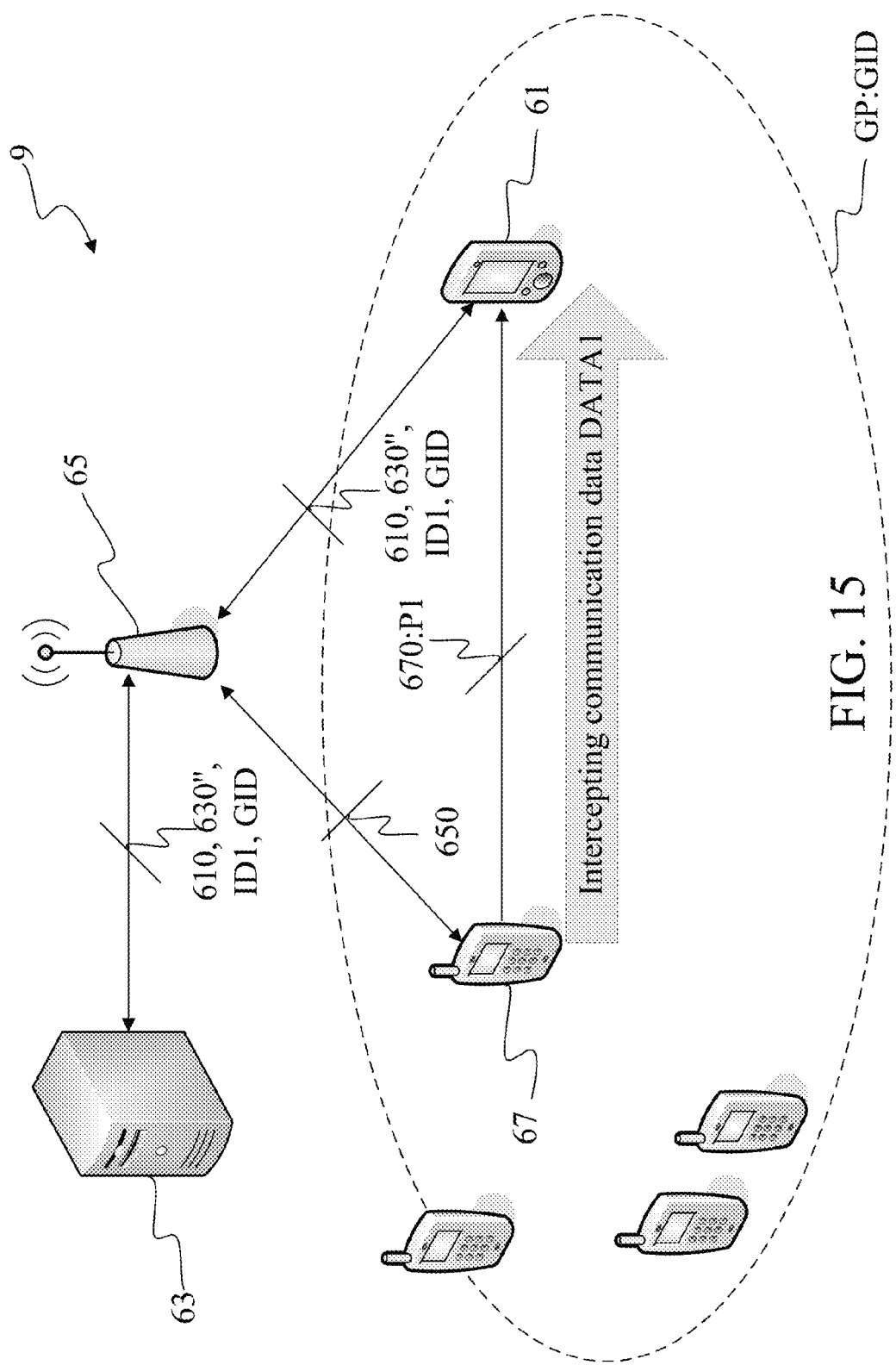
FIG. 15 is a schematic view of a 3GPP direct mode communication system of a fifteenth embodiment of the present invention.

Referring to FIG. 15, there is shown a schematic view illustrating a 3GPP direct mode communication system 9 of a fifteenth embodiment of the present invention. It shall be particularly appreciated that, the fifteenth embodiment has the same system architecture and the same network connection environment as the eleventh embodiments, so the components bearing the same reference numerals also have the same functions and will not be further described herein. The fifteenth embodiment differs from the eleventh embodiment is that user equipment communicate with each other based on grouping.

Firstly, the processor 613 of the intercepting user equipment 61 registers to the administrating server 63 by the transceiver 611 via the eNB 65 for lawful interception. After registering for taking part in the 3GPP direct mode communication system 9, the intercepting user equipment 61 is ready for lawful interception.

In the fifteenth embodiment, the first user equipment 67 is grouped in a user equipment GP which has a group identification GID. Similarly, when the first user equipment 67 with the first identification ID1 is needed to be monitored, the administrating server 63 determines a lawful user equipment from plurality of lawful intercepting user equipment for intercepting the first user equipment 67. In the fifteenth embodiment, intercepting user equipment 61 is determined for intercepting the first user equipment 67 in the user equipment group GP.

Next, the processor 63 of the administrating server 63 initiates the interception by transmitting a positive interception message 630" to the intercepting user equipment 61 by the transceiver 631 via the eNB 65 while the positive interception message 630" comprises the first identification ID1 of the first user equipment 67 and the group identification GID. In other words, the processor 613 of the intercepting user equipment 61 receives the positive interception message 630" from the administrating server 63 by the transceiver 611 via the eNB 65.

Since the intercepting user equipment 61 is notified of intercepting the first user equipment 67 of the user equipment group GP, the intercepting user equipment 61 tries to reach the first user equipment 67. More specifically, in the fifteenth embodiment, the processor 613 of the intercepting user equipment 61 receives the first signal 670 from the first user equipment 67 by the transceiver 611 based on the first identification ID1 and the group identification GID.

Then, the processor 613 of the intercepting user equipment 61 determines whether the first power measurement P1 of the first signal 670 exceeds the threshold or not. If the first power measurement P1 of the first signal 670 exceeds the threshold, it means that the intercepting user equipment 61 is capable of correctly receiving the communication data DATA1 from the first user equipment 67. Accordingly, the intercepting user equipment 61 may intercept the communication data DATA1 of the first user equipment 67 based on the first user identification ID1 and the group identification GID directly.

On the other hand, if the first power measurement P1 of the first signal 670 does not exceed the threshold, it means that the intercepting user equipment 61 may not correctly receive communication data DATA1 from the first user equipment 67 since the power received from the first user equipment 67 is not good enough for reaching the intercepting user equipment 61. Therefore, the transmitting power of the first user equipment 67 should be enhanced.

Accordingly, the processor 613 of the intercepting user equipment 61 transmits the power adjustment request 610 to the administrating server 63 by the transceiver 611 via the eNB 65 based on the determination of that the first power measurement P1 does not exceed the threshold so that the administrating server 63 notifies the eNB 65 of transmitting the power adjustment command 650 to the first user equipment 67 for adjusting transmitting power of the first user equipment 67. Afterwards, in the eleventh embodiment, the processor 613 of the intercepting user equipment 61 is capable of correctly intercepting the communication data DATA1 from the first user equipment 67 based on the first user identification ID1 and the group identification GID by the transceiver 611.

Figure 16:
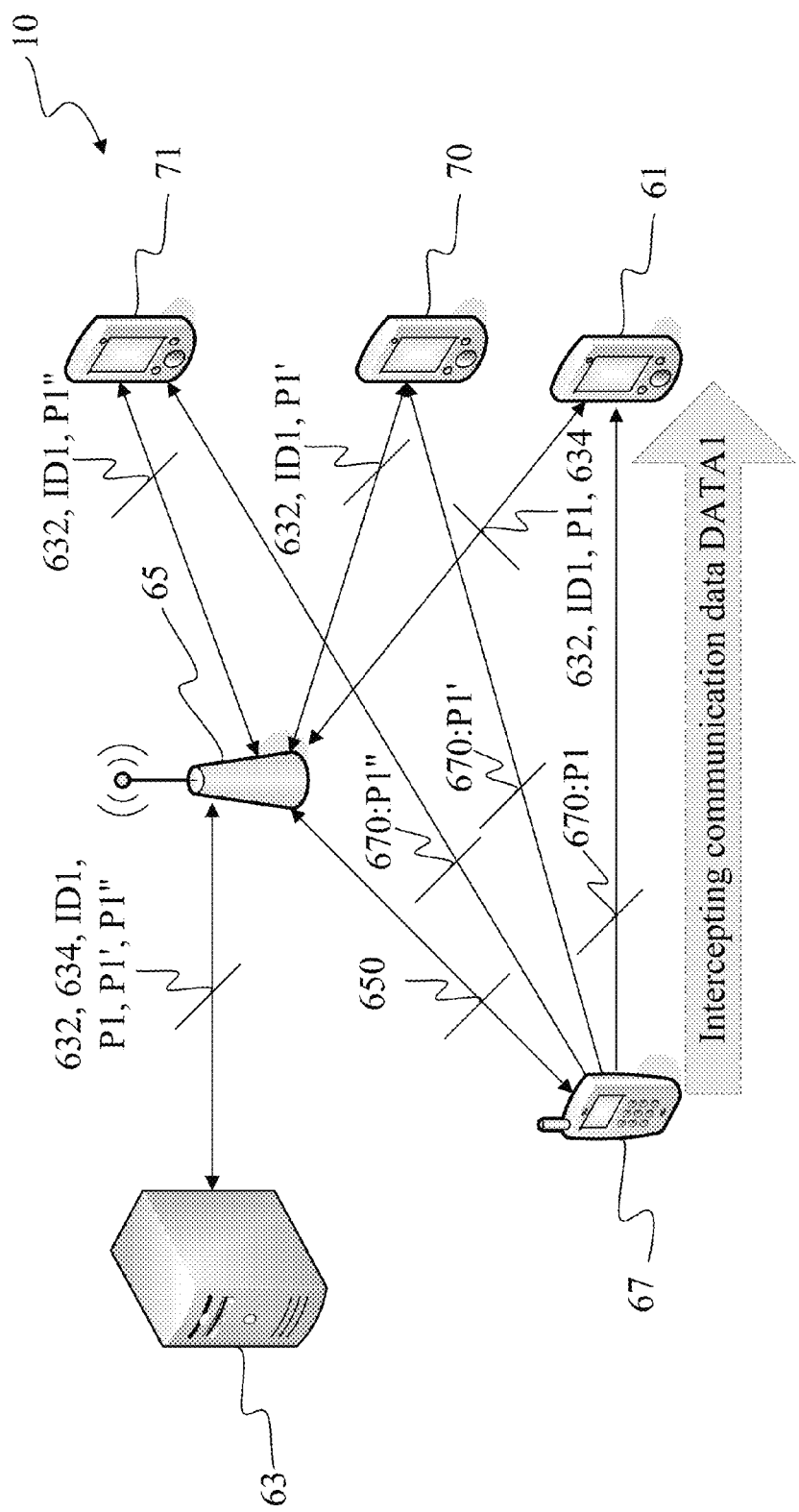
FIG. 16 is a flowchart diagram of a lawful interception method of a sixteenth embodiment of the present invention.

Referring to FIG. 16, there is shown a schematic view illustrating a 3GPP direct mode communication system 10 of a sixteenth embodiment of the present invention. It shall be particularly appreciated that, the sixteenth embodiment has the same system architecture and the same network connection environment as the eleventh embodiments, so the components bearing the same reference numerals also have the same functions and will not be further described herein. The sixteenth embodiment differs from the previous embodiment is that there are plurality of intercepting user equipment for intercepting.

Particularly, in the sixteenth embodiment, there are a plurality of legal intercepting user equipment (which comprise the intercepting user equipment 61, 70 and 71) for intercepting the communication of the first user equipment 67 in the 3GPP direct mode communication system 10. The lawful interception can be achieved as follows.

Firstly, the processor 613 of the intercepting user equipment 61 registers to the administrating server 63 by the transceiver 611 via the eNB 65 for lawful interception. Then, the processor 633 of the administrating server 63 directly transmits an authorization message 632 by the transceiver 631 for authorizing the intercepting user equipment 61 to perform lawful interception, and the authorization message 632 comprises the first identification ID1 of the first user equipment 67. In other words, in the sixteenth embodiment, the feedback of the authorization procedure comprises the first identification ID1 directly.

Similarly, the intercepting user equipment 70 and 71 register to the administrating server 63 via the eNB 65 for lawful interception. Then the administrating server 63 directly transmits the authorization message 632 by the transceiver 631 for authorizing the intercepting user equipment 70 and 71 to perform lawful interception as well.

Next, the processor 613 of the intercepting user equipment 61 measures the first signal 670 from the first user equipment 67 by the transceiver 613 based on the first identification ID1, and reports the first power measurement P1 of the first signal 670 to the administrating server 63. Similarly, the intercepting user equipment 70 and 71 measure the first signal 670 from the first user equipment 67 based on the first identification ID1, and report different power measurements P1' and P1" of the first signal 670 to the administrating server 63.

Afterwards, the processor 633 of the administrating server 63 then determines a power measurement with better communicating quality from the power measurements P1, P1' and P1". In the sixteenth embodiment, the administrating server 63 selects the first power measurements P1. Accordingly, it means that the intercepting user equipment which has the better condition for intercepting the first user equipment 67 is the intercepting user equipment 61.

Then, the processor 633 of the administrating server 63 transmits a notification message 634 by the transceiver 631 for indicating the intercepting user equipment 61 of intercepting the first user equipment 67. In the other hand, the processor 613 of the intercepting user equipment 61 receives the notification message 634 by the transceiver 611 for intercepting the first user equipment 67. Afterwards, in the sixteenth embodiment, the processor 613 of the intercepting user equipment 61 is capable of correctly intercepting the communication data DATA1 from the first user equipment 67 based on the first user identification ID1 by the transceiver 611.

It should be noted that, in the sixteenth embodiment, if the intercepting user equipment 61 cannot correctly intercepting the communication data DATA1 from the first user equipment 67, it means that the power received from the first user equipment 67 is not good enough for the first user equipment 67 to reach the intercepting user equipment 61. Therefore, the transmitting power of the first user equipment 67 should be enhanced.

Accordingly, the processor 613 of the intercepting user equipment 61 transmits the power adjustment request 610 to the administrating server 63 by the transceiver 611 via the eNB 65 directly so that the administrating server 63 notifies the eNB 65 of transmitting the power adjustment command 650 to the first user equipment 67 for adjusting transmitting power of the first user equipment 67. Afterwards, in the sixteenth embodiment, the processor 613 of the intercepting user equipment 61 is capable of correctly intercepting the communication data DATA1 from the first user equipment 67 based on the first user identification ID1 by the transceiver 611.

It should be noted that, in the sixteenth embodiment, the administrating server 63 may transmit a notification message to the intercepting user equipment 61 for stopping the lawful interception if the other intercepting user equipment 70 or 71 can continue the lawful interception without adjusting the power of the first user equipment 67.

Figure 17:
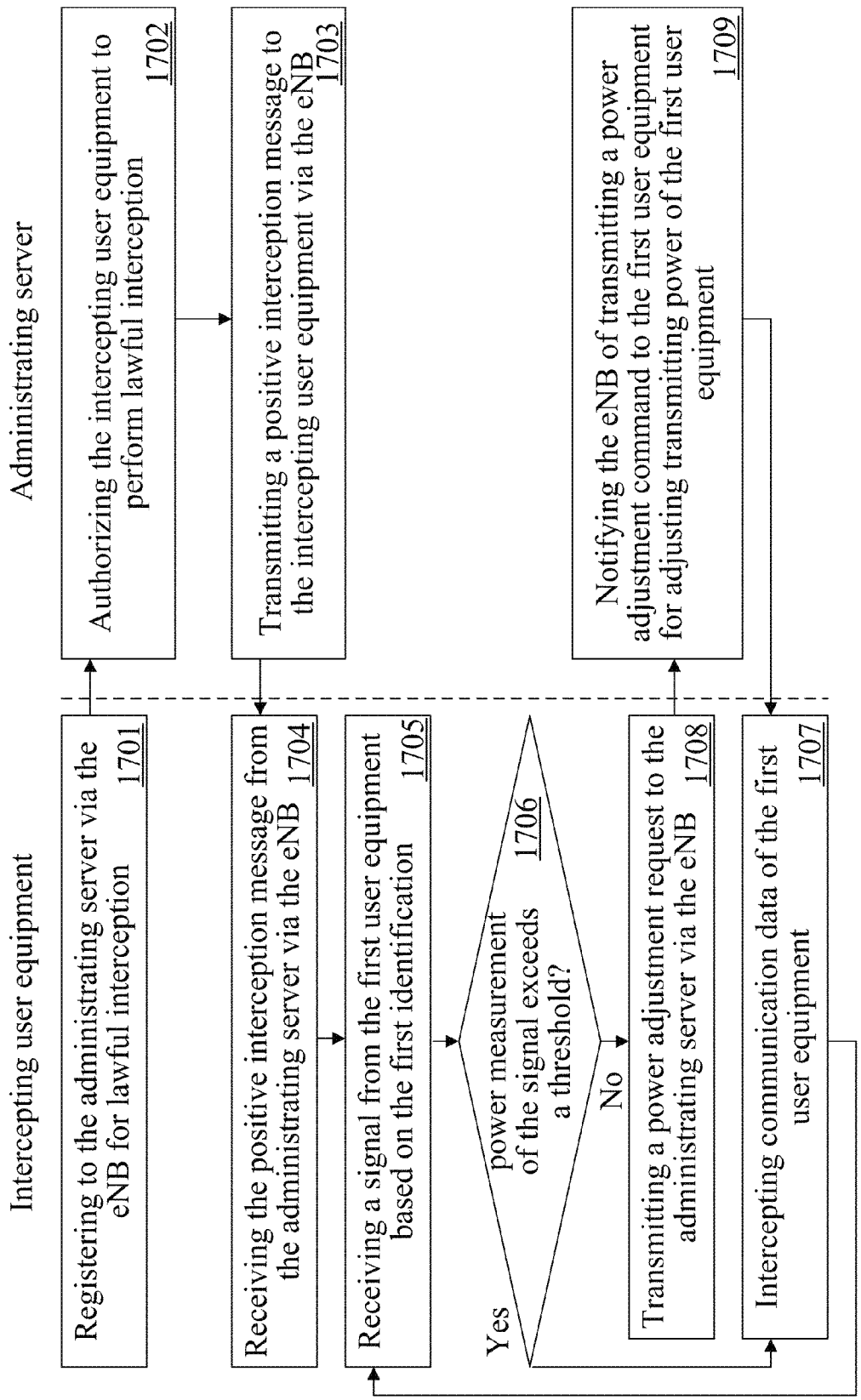
FIG. 17 is a flowchart diagram of a lawful interception method of a seventeenth embodiment of the present invention.

A seventeenth embodiment of the present invention is a lawful interception method. A flowchart diagram of which is shown in FIG. 17. The lawful interception method of the seventeenth embodiment is for use in a 3GPP direct mode communication system (e.g., the 3GPP direct mode communication system 6 of the eleventh embodiment). The 3GPP direct mode communication system comprises an intercepting user equipment, an administrating server and an eNB. Steps of the seventeenth embodiment are detailed as follows.

Firstly, step 1701 is executed to register, by the intercepting user equipment, to the administrating server via the eNB for lawful interception. Then, step 1702 is executed to authorize, by the administrating server, the intercepting user equipment to perform lawful interception. Step 1703 is executed to transmit, by the administrating server, a positive interception message to the intercepting user equipment via the eNB. Step 1704 is executed to receive, by the intercepting user equipment, the positive interception message from the administrating server via the eNB after step 1703. The positive interception message comprises a first identification of a first user equipment.

Step 1705 is executed to receiving, by the intercepting user equipment, a signal from the first user equipment based on the first identification. Step 1706 is executed to determine, by the intercepting user equipment, whether a power measurement of the signal exceeds a threshold. If the power measurement of the signal exceeds the threshold, step 1707 is executed to intercepting, by the intercepting user equipment, communication data of the first user equipment.

If the power measurement of the signal does not exceed the threshold, step 1708 is executed to transmit, by the intercepting user equipment, a power adjustment request to the administrating server via the eNB. Step 1709 is executed to notify, by the administrating server, the eNB of transmitting a power adjustment command to the first user equipment for adjusting transmitting power of the first user equipment. Then step 1707 is executed to intercepting, by the intercepting user equipment, the communication data of the first user equipment.

It should be noted that, after intercepting the communication data, step 1705 can be further executed to repeat the power adjustment scheme for the intercepting user equipment to continuously and correctly intercept the communication data of the first user equipment.

Figure 18:
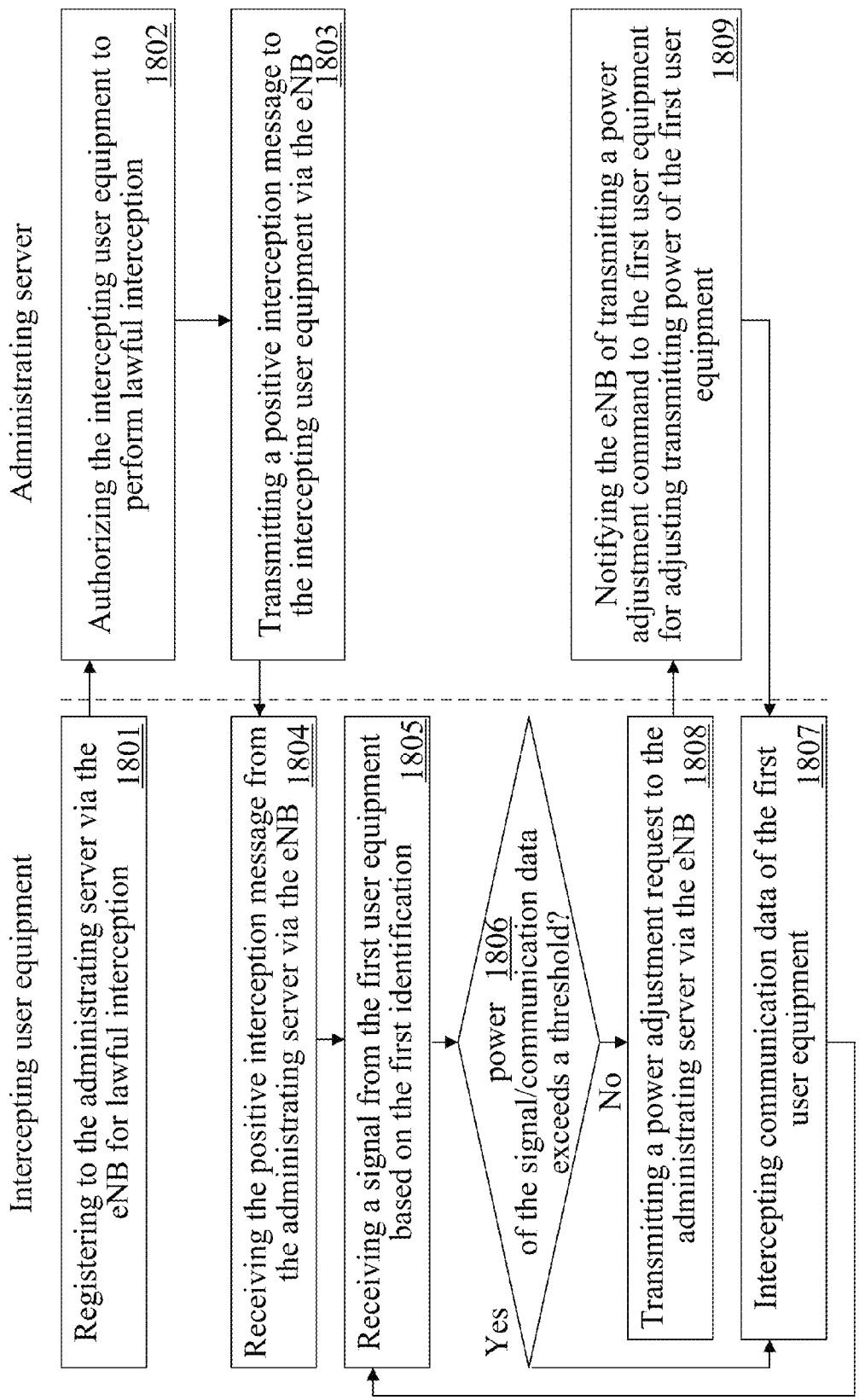
FIG. 18 is a flowchart diagram of a lawful interception method of a eighteenth embodiment of the present invention.

An eighteenth embodiment of the present invention is a lawful interception method. A flowchart diagram of which is shown in FIG. 18. The lawful interception method of the sixteenth embodiment is for use in a 3GPP direct mode communication system (e.g., the 3GPP direct mode communication system of the previous embodiments). The 3GPP direct mode communication system comprises an intercepting user equipment, an administrating server and an eNB. Steps of the sixteenth embodiment are detailed as follows.

Firstly, step 1801 is executed to register, by the intercepting user equipment, to the administrating server via the eNB for lawful interception. Then, step 1802 is executed to authorize, by the administrating server, the intercepting user equipment to perform lawful interception. Step 1803 is executed to transmit, by the administrating server, a positive interception message to the intercepting user equipment via the eNB. Step 1804 is executed to receive, by the intercepting user equipment, the positive interception message from the administrating server via the eNB after step 1803. The positive interception message comprises a first identification of a first user equipment.

Step 1805 is executed to receiving, by the intercepting user equipment, a signal from the first user equipment based on the first identification. Step 1806 is executed to determine, by the intercepting user equipment, whether a power measurement of the signal exceeds a threshold. If the power measurement of the signal exceeds the threshold, step 1807 is executed to intercepting, by the intercepting user equipment, communication data of the first user equipment.

If the power measurement of the signal does not exceed the threshold, step 1808 is executed to transmit, by the intercepting user equipment, a power adjustment request to the administrating server via the eNB. Step 1809 is executed to notify, by the administrating server, the eNB of transmitting a power adjustment command to the first user equipment for adjusting transmitting power of the first user equipment. Then step 1807 is executed to intercepting, by the intercepting user equipment, the communication data of the first user equipment.

Similarly, in the eighteenth embodiment, after intercepting the communication data, step 1805 can be further executed to repeat the power adjustment scheme for the intercepting user equipment to continuously and correctly intercept the communication data of the first user equipment. However, it should be noted that, instead of the power measurement of the signal, power measurement of the communication data can used for comparing with the threshold in the eighteenth embodiment.

Figure 19:
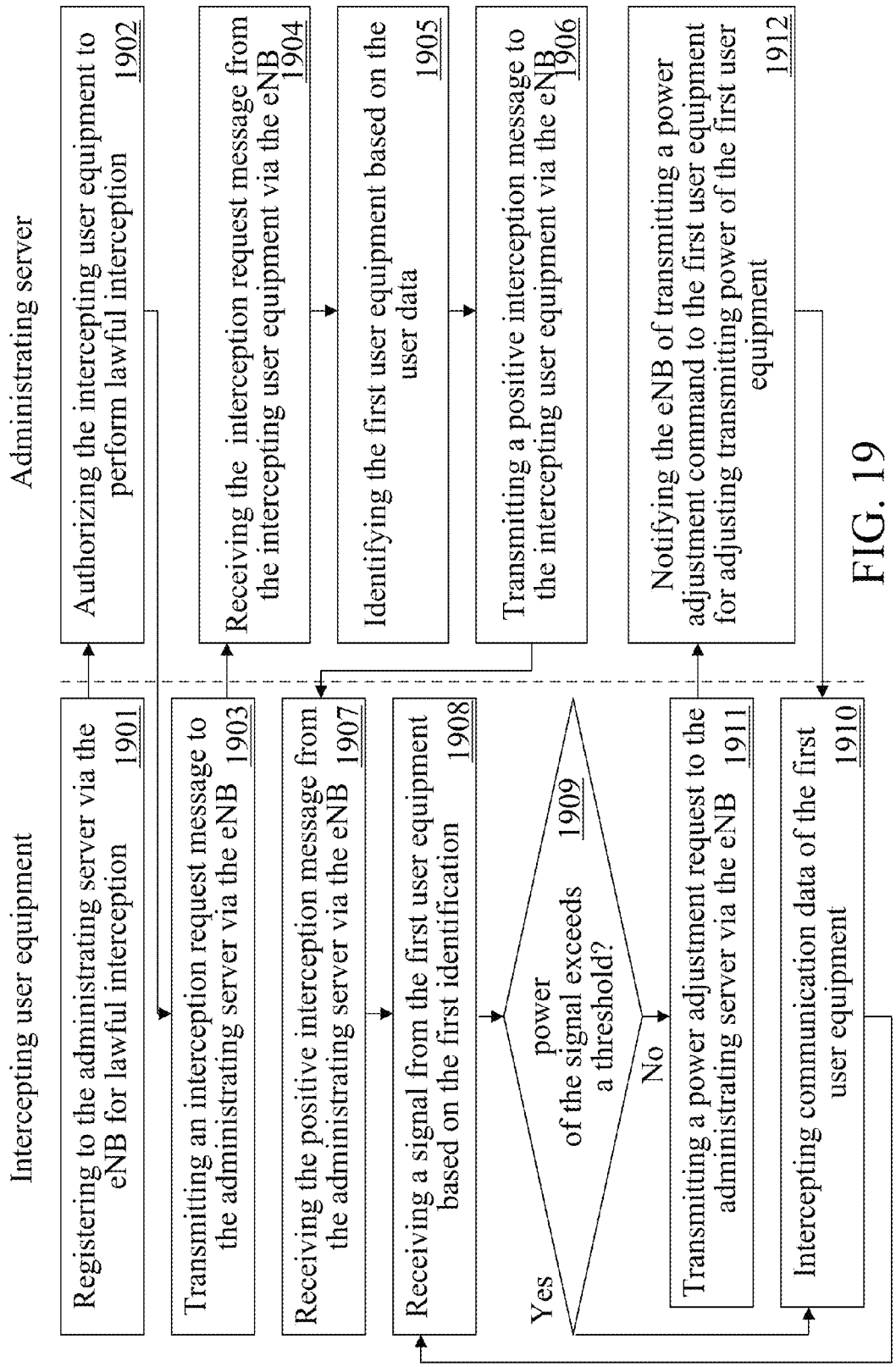
FIG. 19 is a flowchart diagram of a lawful interception method of a nineteenth embodiment of the present invention.

An nineteenth embodiment of the present invention is a lawful interception method. A flowchart diagram of which is shown in FIG. 19. The lawful interception method of the sixteenth embodiment is for use in a 3GPP direct mode communication system (e.g., the 3GPP direct mode communication system of the previous embodiments). The 3GPP direct mode communication system comprises an intercepting user equipment, an administrating server and an eNB. Steps of the nineteenth embodiment are detailed as follows.

Firstly, step 1901 is executed to register, by the intercepting user equipment, to the administrating server via the eNB for lawful interception. Then, step 1902 is executed to authorize, by the administrating server, the intercepting user equipment to perform lawful interception. Step 1903 is executed to transmit, by the intercepting user equipment, an intercepting request message to the administrating server. The intercepting request message comprises user data. Step 1904 is executed to receive, by the administrating server, the intercepting request message from the intercepting user equipment. Step 1905 is executed to identify, by the administrating server, a first user equipment based on the user data.

Step 1906 is executed to transmit, by the administrating server, a positive interception message to the intercepting user equipment via the eNB based on the intercepting request message. Step 1907 is executed to receive, by the intercepting user equipment, the positive interception message from the administrating server via the eNB after step 1906. The positive interception message comprises a first identification of the first user equipment.

Step 1908 is executed to receiving, by the intercepting user equipment, a signal from the first user equipment based on the first identification. Step 1909 is executed to determine, by the intercepting user equipment, whether a power measurement of the signal exceeds a threshold. If the power measurement of the signal exceeds the threshold, step 1910 is executed to intercepting, by the intercepting user equipment, communication data of the first user equipment.

If the power measurement of the signal does not exceed the threshold, step 1911 is executed to transmit, by the intercepting user equipment, a power adjustment request to the administrating server via the eNB. Step 1912 is executed to notify, by the administrating server, the eNB of transmitting a power adjustment command to the first user equipment for adjusting transmitting power of the first user equipment. Then step 1910 is executed to intercepting, by the intercepting user equipment, the communication data of the first user equipment.

Figure 20:
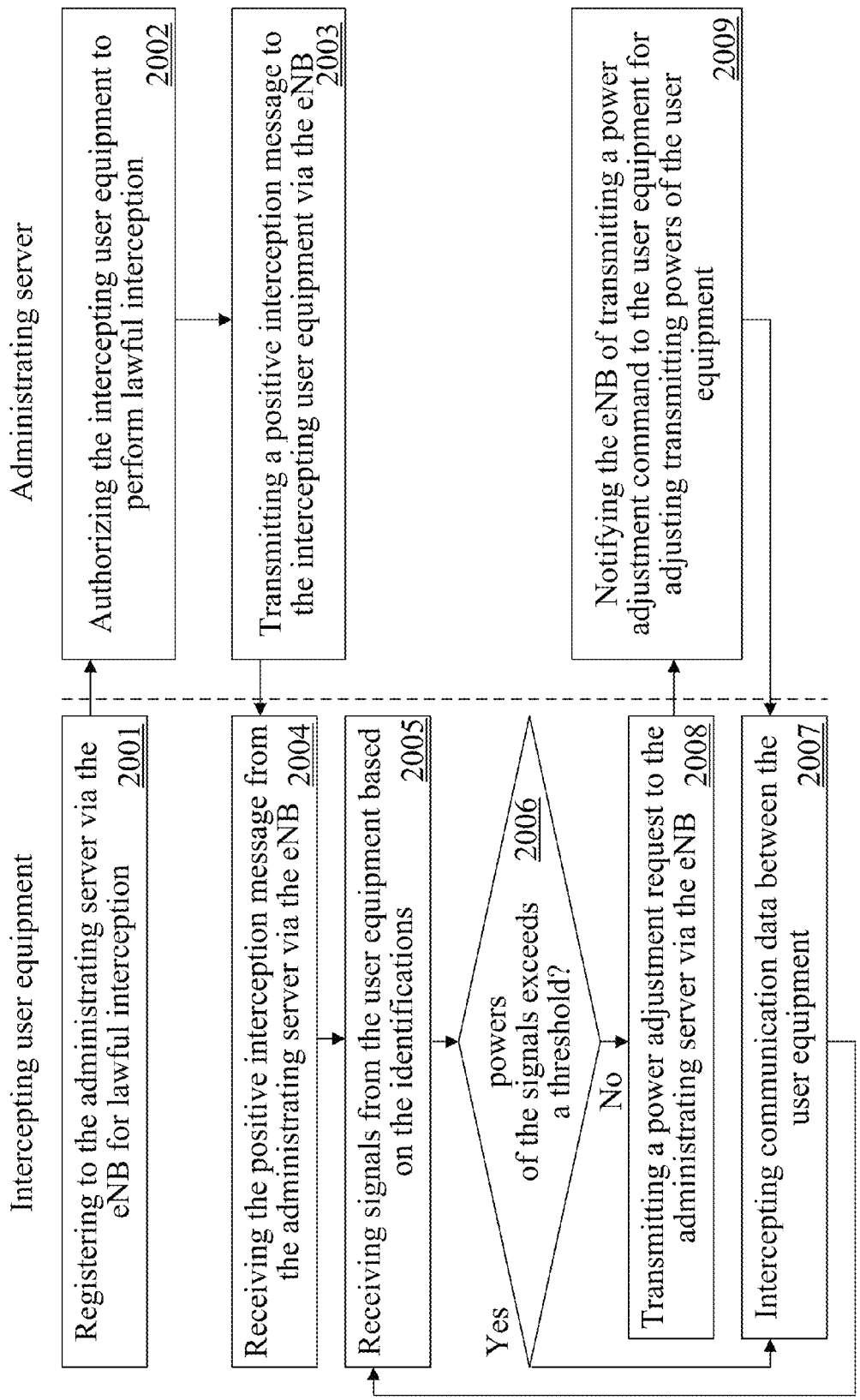
FIG. 20 is a flowchart diagram of a lawful interception method of a twentieth embodiment of the present invention.

A twentieth embodiment of the present invention is a lawful interception method. A flowchart diagram of which is shown in FIG. 20. The lawful interception method of the twentieth embodiment is for use in a 3GPP direct mode communication system (e.g., the 3GPP direct mode communication system of the previous embodiments). The 3GPP direct mode communication system comprises an intercepting user equipment, an administrating server and an eNB. Steps of the twentieth embodiment are detailed as follows.

Firstly, step 2001 is executed to register, by the intercepting user equipment, to the administrating server via the eNB for lawful interception. Then, step 2002 is executed to authorize, by the administrating server, the intercepting user equipment to perform lawful interception. Step 2003 is executed to transmit, by the administrating server, a positive interception message to the intercepting user equipment via the eNB. Step 2004 is executed to receive, by the intercepting user equipment, the positive interception message from the administrating server via the eNB after step 2003. The positive interception message comprises a first identification of a first user equipment and a second identification of a second user equipment.

Step 2005 is executed to receiving, by the intercepting user equipment, a first signal from the first user equipment and a second signal from the second user equipment based on the first identification and the second identification. Step 2006 is executed to determine, by the intercepting user equipment, whether power measurements of the signals exceeds a threshold. If the first power measurement of the first signal or the second power measurement of the signal exceeds the threshold, step 2007 is executed to intercepting, by the intercepting user equipment, communication data between the first user equipment and the second user equipment.

If the first measurement power of the first signal and the second power measurement of the second signal do not exceed the threshold, step 2008 is executed to transmit, by the intercepting user equipment, a power adjustment request to the administrating server via the eNB. Step 2009 is executed to notify, by the administrating server, the eNB of transmitting a power adjustment command to the first user equipment and the second user equipment for adjusting transmitting powers of the first user equipment and the second user equipment. Then step 2007 is executed to intercepting, by the intercepting user equipment, the communication data between the first user equipment and the second user equipment.

Figure 21:
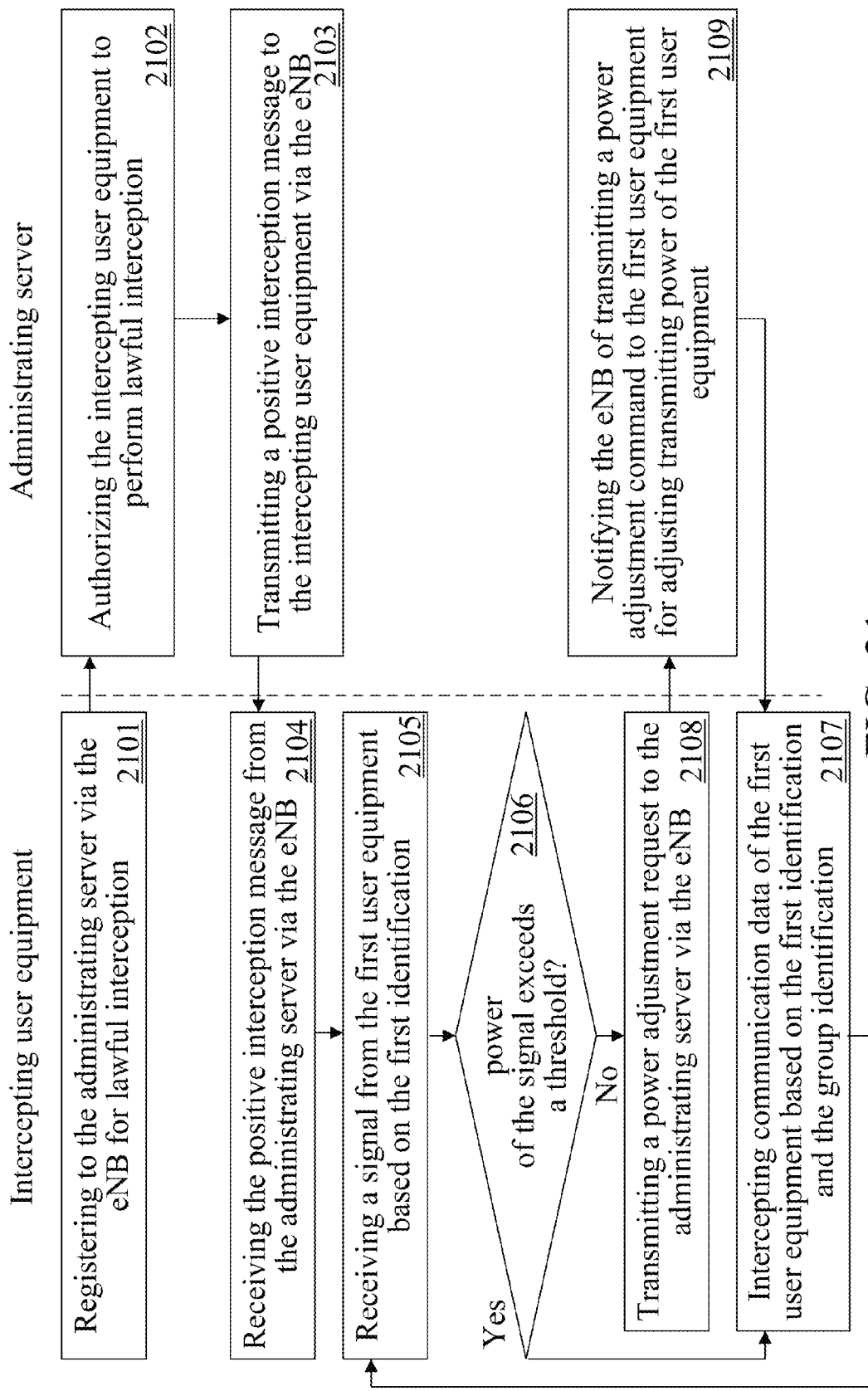
FIG. 21 is a flowchart diagram of a lawful interception method of a twenty-first embodiment of the present invention.

A twenty-first embodiment of the present invention is a lawful interception method. A flowchart diagram of which is shown in FIG. 21. The lawful interception method of the twenty-first embodiment is for use in a 3GPP direct mode communication system (e.g., the 3GPP direct mode communication system of the precious embodiments). The 3GPP direct mode communication system comprises an intercepting user equipment, an administrating server and an eNB. Steps of the twenty-first embodiment are detailed as follows.

Firstly, step 2101 is executed to register, by the intercepting user equipment, to the administrating server via the eNB for lawful interception. Then, step 2102 is executed to authorize, by the administrating server, the intercepting user equipment to perform lawful interception. Step 2103 is executed to transmit, by the administrating server, a positive interception message to the intercepting user equipment via the eNB. Step 2104 is executed to receive, by the intercepting user equipment, the positive interception message from the administrating server via the eNB after step 2103. The positive interception message comprises a first identification of a first user equipment and a group identification of a user equipment group. The first user equipment is grouped in the user equipment group.

Step 2105 is executed to receiving, by the intercepting user equipment, a signal from the first user equipment based on the first identification. Step 2106 is executed to determine, by the intercepting user equipment, whether a power measurement of the signal exceeds a threshold. If the power measurement of the signal exceeds the threshold, step 2107 is executed to intercepting, by the intercepting user equipment, communication data of the first user equipment based on the first identification and the group identification.

If the power measurement of the signal does not exceed the threshold, step 2108 is executed to transmit, by the intercepting user equipment, a power adjustment request to the administrating server via the eNB. Step 2109 is executed to notify, by the administrating server, the eNB of transmitting a power adjustment command to the first user equipment for adjusting transmitting power of the first user equipment. Then step 2107 is executed to intercepting, by the intercepting user equipment, the communication data of the first user equipment based on the first identification and the group identification.

Figure 22:
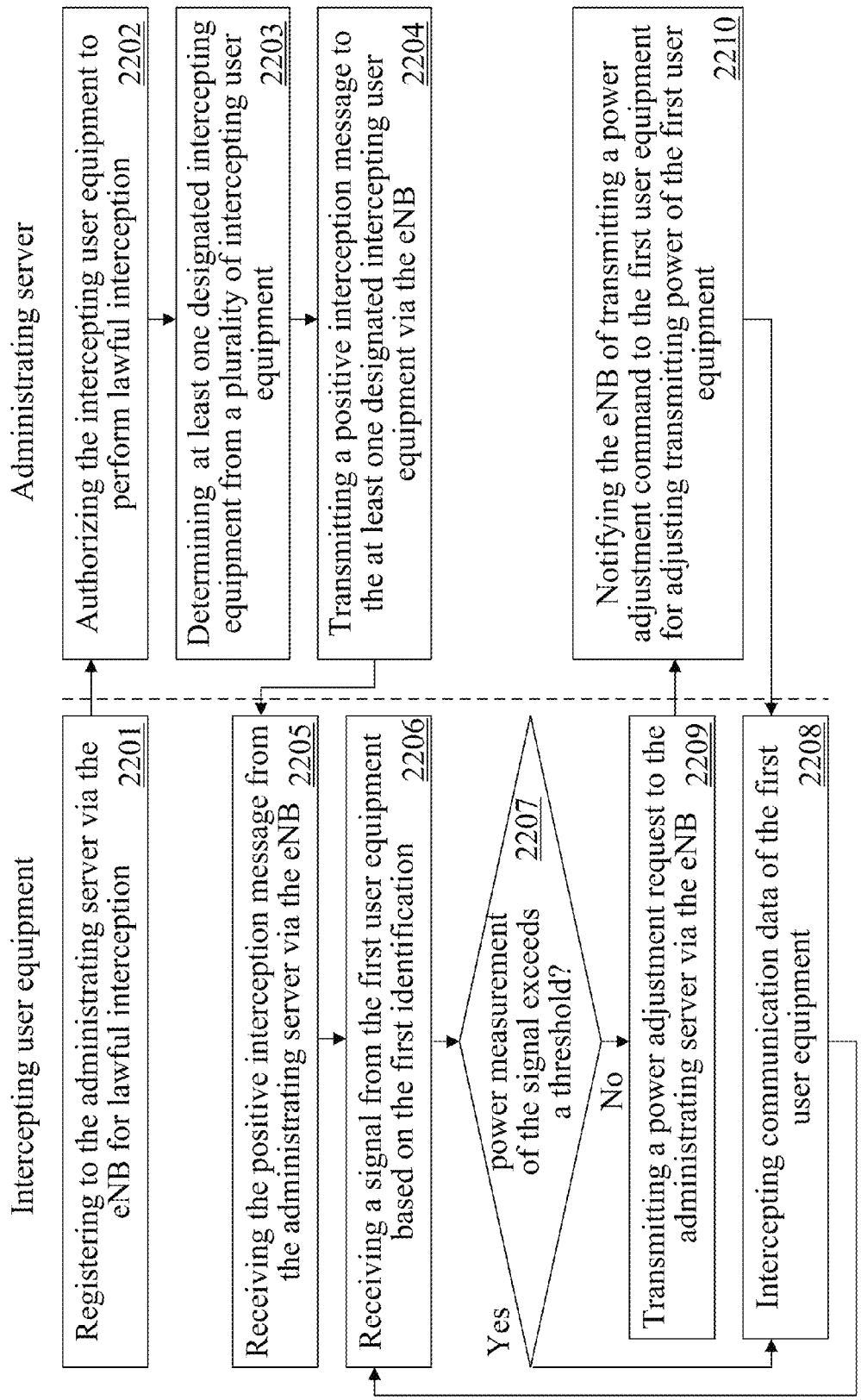
FIG. 22 is a flowchart diagram of a lawful interception method of a twenty-second embodiment of the present invention.

A twenty-second embodiment of the present invention is a lawful interception method. A flowchart diagram of which is shown in FIG. 22. The lawful interception method of the twenty-second embodiment is for use in a 3GPP direct mode communication system (e.g., the 3GPP direct mode communication system of the previous embodiments). The 3GPP direct mode communication system comprises a plurality of intercepting user equipment, an administrating server and an eNB. Steps of the twenty-second embodiment are detailed as follows.

Firstly, step 2201 is executed to register, by each of the intercepting user equipment, to the administrating server via the eNB for lawful interception. Then, step 2202 is executed to authorize, by the administrating server, the intercepting user equipment to perform lawful interception. Then, step 2203 is executed to determine, by the administrating server, at least one designated intercepting user equipment from the plurality of intercepting user equipment based on a plurality of power measurements from the plurality of intercepting user equipment (whose power measurements could be good enough for the lawful interception) or location information of the plurality of intercepting user equipment (whose distance to the first user equipment 67 is shorter than a predefined distance).

Next, step 2204 is executed to transmit, by the administrating server, a positive interception message to the at least one designated intercepting user equipment via the eNB. Step 2205 is executed to receive, by the at least one designated intercepting user equipment, the positive interception message from the administrating server via the eNB after step 2204. The positive interception message comprises a first identification of a first user equipment.

Step 2206 is executed to receiving, by the at least one designated intercepting user equipment, a signal from the first user equipment based on the first identification. Step 2207 is executed to determine, by the intercepting user equipment, whether a power measurement of the signal exceeds a threshold. If the power measurement of the signal exceeds the threshold, step 2208 is executed to intercepting, by the at least one designated intercepting user equipment, communication data of the first user equipment.

If the power measurement of the signal does not exceed the threshold, step 2209 is executed to transmit, by the at least one designated intercepting user equipment, a power adjustment request to the administrating server via the eNB. Step 2210 is executed to notify, by the administrating server, the eNB of transmitting a power adjustment command to the first user equipment for adjusting transmitting power of the first user equipment. Then step 2208 is executed to intercepting, by the at least one designated intercepting user equipment, the communication data of the first user equipment.

Figure 23A:
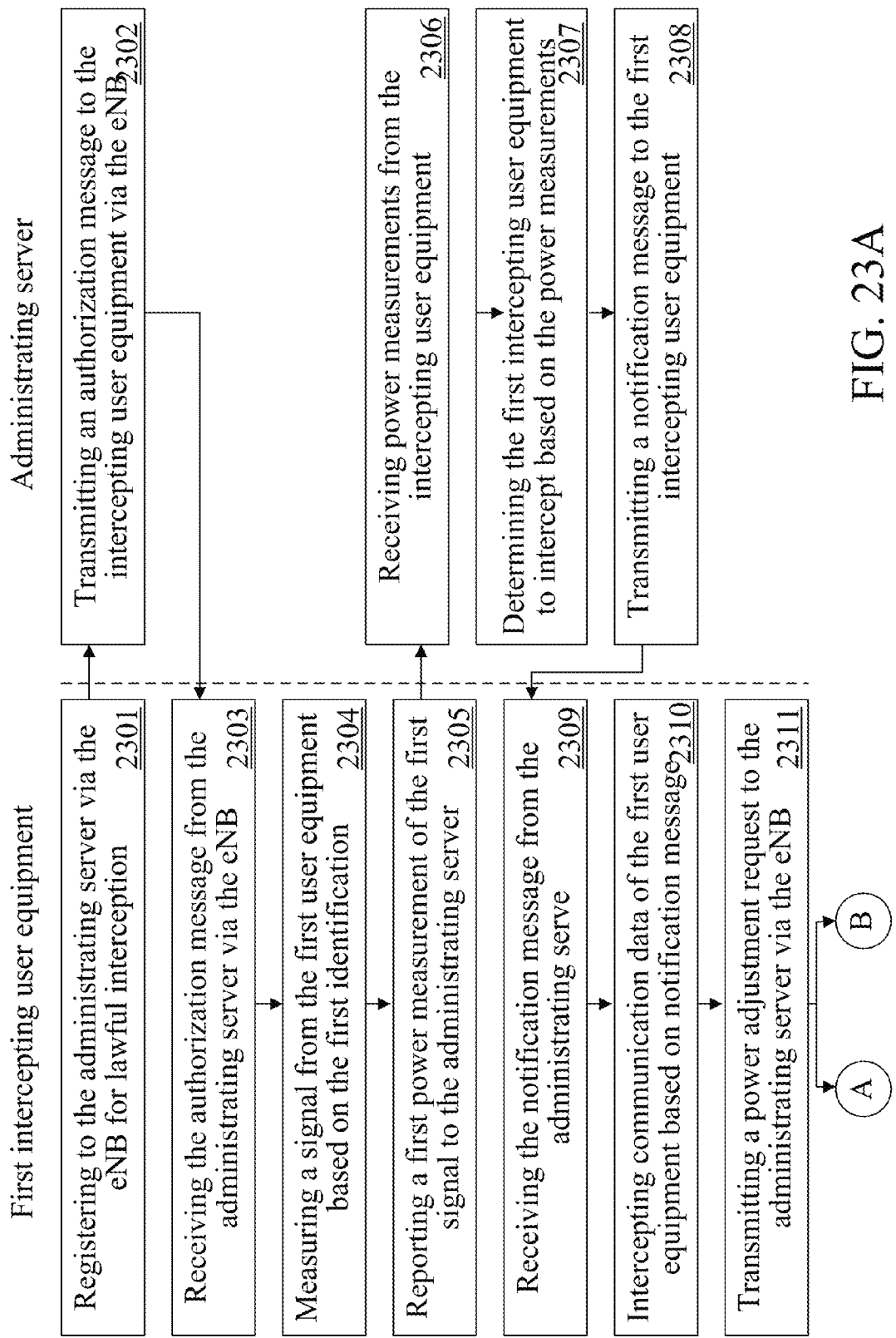
FIGS. 23A-23C are flowchart diagrams of a lawful interception method of a twenty-third embodiment of the present invention.
Figure 23B:
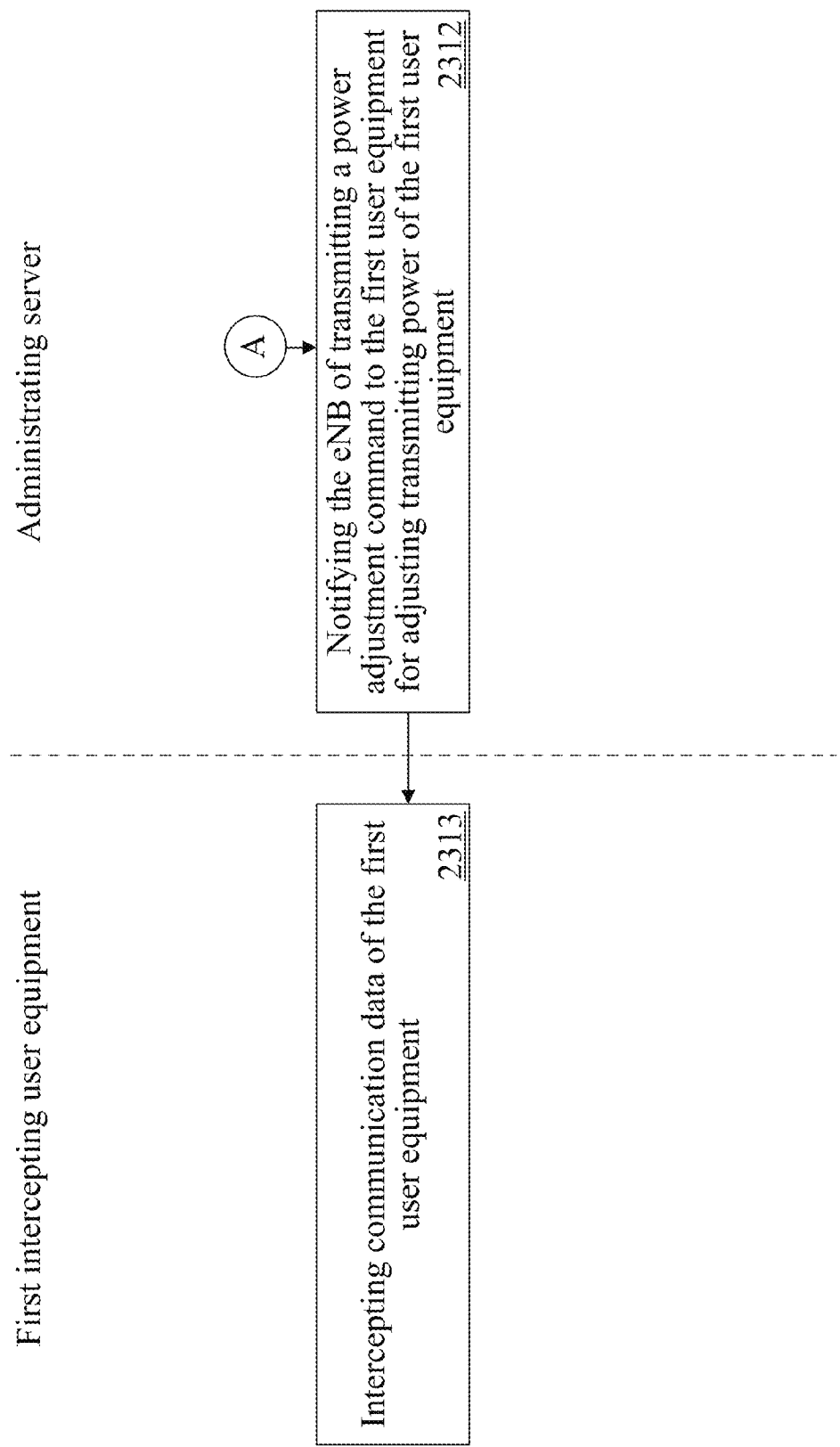
Figure 23C:
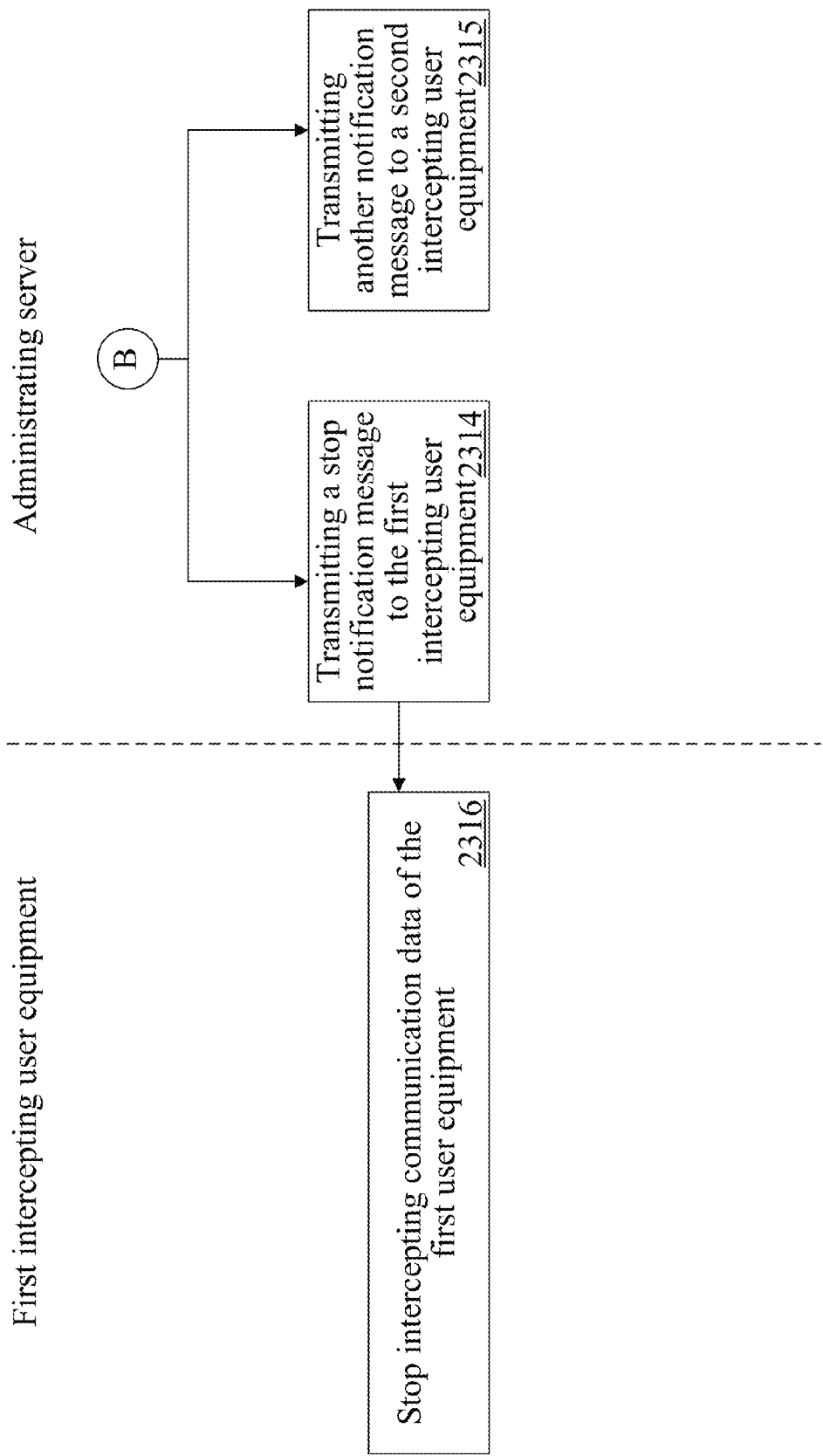

A twenty-third embodiment of the present invention is a lawful interception method. A flowchart diagram of which is shown in FIGS. 23A-23C. The lawful interception method of the twenty-third embodiment is for use in a 3GPP direct mode communication system (e.g., the 3GPP direct mode communication system of the previous embodiments). The 3GPP direct mode communication system comprises a first intercepting user equipment, at least one second intercepting user equipment, a first user equipment, an administrating server and an eNB. Steps of the twenty-third embodiment are detailed as follows.

Firstly, step 2301 is executed to register, by the first intercepting user equipment, to the administrating server via the eNB for lawful interception. Step 2302 is executed to transmit, by the administrating server, an authorization message to the first intercepting user equipment and the at least one second intercepting user equipment via the eNB. The authorization message comprises a first identification of the first user equipment. Step 2303 is executed to receive, by the first intercepting user equipment, the authorization message from the administrating server via the eNB.

Step 2304 is executed to measure, by the first intercepting user equipment, a first signal from the first user equipment based on the first identification. Step 2305 is executed to report, by the first intercepting user equipment, a first power measurement of the first signal to the administrating server. Step 2306 is executed to receive, by the administrating server, power measurements from the first intercepting user equipment and the at least one second intercepting user equipment. Step 2307 is executed to determine, by the administrating server, the first intercepting user equipment to intercept based on the power measurements.

Step 2308 is executed to transmit, by the administrating server, a notification message to the first intercepting user equipment. The notification message comprises an indication of intercepting communication. Step 2309 is executed to receive, by the first intercepting user equipment, the notification message from the administrating server. Step 2310 is executed to intercept, by the first intercepting user equipment, communication data of the first user equipment based on the notification message.

It should be noted that, if the first intercepting user equipment cannot correctly intercepting the communication data from the first user equipment, it means that the power received from the first user equipment is not good enough for the first user equipment to reach the intercepting user equipment. Then, step 2311 is executed to transmit, by the first intercepting user equipment, a power adjustment request to the administrating server via the eNB for notifying the administrating server of handling this situation. Afterwards, the execution of steps 2312-2313 or the execution of step 2314-2316 are optional.

Please refer to FIG. 23B. In one implementation, step 2312 is executed to notify, by the administrating server, the eNB of transmitting a power adjustment command to the first user equipment for adjusting transmitting power of the first user equipment. Then step 2313 is executed to intercepting, by the first intercepting user equipment, the communication data of the first user equipment.

On the other hand, please refer to FIG. 23C. Specifically, in another implementation, step 2314 is executed to transmit, by the administrating server, a stop notification message to the first intercepting user equipment for notifying the first intercepting user equipment of stopping the interception. Meanwhile, step 2315 is executed to transmit, by the administrating server, another notification message to a second intercepting user equipment to continue the interception of the first user equipment. Step 2316 is executed to receive, by the first intercepting user equipment, to stop intercepting the communication data of the first user equipment.

It should be note that the selection of the second intercepting user equipment for intercepting the first user equipment is similar as the selection of the first intercepting user equipment according to steps 2301-2307. Accordingly, it will not be further described herein.

According to the above descriptions, the network device and the lawful interception method of the present invention can be introduced in the direct mode communication for intercepting the communications between mobile stations of direct mode communication.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A lawful interception method for an intercepting user equipment, the intercepting user equipment being used in a 3GPP direct mode communication system, the 3GPP direct mode communication system comprising the intercepting user equipment, a first user equipment, an administrating server and an eNB, the lawful interception method comprising:
   (a) registering, by the intercepting user equipment, to the administrating server via the eNB for lawful interception;
   (b) receiving, by the intercepting user equipment, a positive interception message from the administrating server via the eNB after step (a), wherein the positive interception message comprises a first identification of the first user equipment;
   (c) receiving, by the intercepting user equipment, a first signal from the first user equipment based on the first identification;
   (d) determining, by the intercepting user equipment, that a first power measurement of the first signal does not exceed a threshold;
   (e) transmitting, by the intercepting user equipment, a power adjustment request to the administrating server via the eNB based on the result of step (d) so that the administrating server notifies the eNB of transmitting a power adjustment command to the first user equipment for adjusting transmitting power of the first user equipment;
   (f) intercepting, by the intercepting user equipment, communication data of the first user equipment based on the first user identification after step (e).

2. The lawful interception method as claimed in claim 1, further comprising:
   (g) determining, by the intercepting user equipment, that a power measurement of the communication data does not exceed the threshold;
   (h) transmitting, by the intercepting user equipment, another power adjustment request to the administrating server via the eNB based on the result of step (g) so that the administrating server notifies the eNB of transmitting another power adjustment command to the first user equipment for adjusting transmitting power of the first user equipment.

3. The lawful interception method as claimed in claim 1, further comprising following step before step (b):
   (b1) transmitting, by the intercepting user equipment, an interception request message to the administrating server via the eNB, wherein the interception request message comprises user data so that the administrating server identifies the first user equipment based on the user data.

4. The lawful interception method as claimed in claim 1, further comprising following step before step (f):
   (f1) receiving, by the intercepting user equipment, a second signal from the first user equipment based on the first identification;
   (f2) determining, by the intercepting user equipment, that a second power measurement of the second signal exceeds the threshold.

5. The lawful interception method as claimed in claim 1, wherein the positive interception response message further comprises a second identification of a second user equipment while the second user equipment is communicating with the first user equipment, and step (c) further comprises:
   (c1) receiving, by the intercepting user equipment, the first signal from the first user equipment based on the first identification and a second signal from the second user equipment based on the second identification;
   wherein step (d) further comprises:
   (d1) determining, by the intercepting user equipment, that the first power measurement of the first signal does not exceed the threshold and a second power measurement of the second signal does not exceed the threshold;
   wherein step (e) further comprises:
   (e1) transmitting, by the intercepting user equipment, the power adjustment request to the administrating server via the eNB based on the result of step (d1) so that the administrating server notifies the eNB of transmitting the power adjustment command to the first user equipment and the second user equipment for adjusting transmitting powers of the first user equipment and the second user equipment;
   wherein step (f) further comprises:
   (f1) intercepting, by the intercepting user equipment, the communication data between the first user equipment and the second user equipment based on the first identification and the second identification after step (e1).

6. The lawful interception method as claimed in claim 1, wherein the first user equipment is grouped in a user equipment group, the positive interception response message further comprises a group identification of the user equipment group, and step (c) further comprises:
   (c1) receiving, by the intercepting user equipment, the first signal from the first user equipment based on the first identification and the group identification;
   wherein step (f) further comprises:
   (f1) intercepting, by the intercepting user equipment, the communication data of the first user equipment based on the first identification and the group identification after step (e).

7. An intercepting user equipment for use in a 3GPP direct mode communication system, the 3GPP direct mode communication system comprising the intercepting user equipment, a first user equipment, an administrating server and an eNB, and the intercepting user equipment comprising:
   a transceiver; and
   a processor;
   wherein the processor is configured to:
      register to the administrating server by the transceiver via the eNB for lawful interception;
      receive a positive interception message from the administrating server by the transceiver via the eNB after registering to the administrating server, wherein the positive interception message comprises a first identification of the first user equipment;
      receive a first signal from the first user equipment by the transceiver based on the first identification;
      determine that a first power measurement of the first signal does not exceed a threshold;
      transmit a power adjustment request to the administrating server by the transceiver via the eNB based on the determination of that the first power measurement does not exceed the threshold so that the administrating server notifies the eNB of transmitting a power adjustment command to the first user equipment for adjusting transmitting power of the first user equipment;
      intercept communication data of the first user equipment based on the first user identification by the transceiver.

8. The intercepting user equipment as claimed in claim 7, wherein the processor is further configured to:
   determine that a power measurement of the communication data does not exceed the threshold;
   transmit another power adjustment request to the administrating server via the eNB based on the determination of that the power measurement of the communication data does not exceed the threshold so that the administrating server notifies the eNB of transmitting another power adjustment command to the first user equipment for adjusting transmitting power of the first user equipment.

9. The intercepting user equipment as claimed in claim 7, wherein the processor is further configured to:
   transmit an interception request message to the administrating server by the transceiver via the eNB, wherein the interception request message comprises user data so that the administrating server identifies the first user equipment based on the user data.

10. The intercepting user equipment as claimed in claim 7, wherein the processor is further configured to:
    receive a second signal from the first user equipment by the transceiver based on the first identification;
    determine that a second power measurement of the second signal exceeds the threshold.

11. The intercepting user equipment as claimed in claim 7, wherein the positive interception response message further comprises a second identification of a second user equipment while the second user equipment is communicating with the first user equipment, and the processor is further configured to:
    receive the first signal from the first user equipment by the transceiver based on the first identification;
    receive a second signal from the second user equipment by the transceiver based on the second identification;
    determine that the first power measurement of the first signal does not exceed the threshold and a second power measurement of the second signal does not exceed the threshold;
    transmit the power adjustment request to the administrating server by the transceiver via the eNB based on the determination of that the first power of the first signal does not exceed the threshold and the second power of the second signal does not exceed the threshold so that the administrating server notifies the eNB of transmitting the power adjustment command to the first user equipment and the second user equipment for adjusting transmitting powers of the first user equipment and the second user equipment;
intercept the communication data between the first user equipment and the second user equipment by the transceiver based on the first identification and the second identification.

12. The intercepting user equipment as claimed in claim 7, wherein the first user equipment is grouped in a user equipment group, the positive interception response message further comprises a group identification of the user equipment group, and the processor is further configured to:
receive the first signal from the first user equipment by the transceiver based on the first identification and the group identification;
intercept the communication data of the first user equipment by the transceiver based on the first identification and the group identification.

13. A first intercepting user equipment for use in a 3GPP direct mode communication system, the 3GPP direct mode communication system comprising the first intercepting user equipment, at least one second intercepting user equipment, a first user equipment, an administrating server and an eNB, and the first intercepting user equipment comprising:
a transceiver; and
a processor;
wherein the processor is configured to:
register to the administrating server by the transceiver via the eNB for lawful interception;
receive an authorization message from the administrating server by the transceiver via the eNB, wherein the authorization message comprises a first identification of the first user equipment;
measure a first signal from the first user equipment by the transceiver based on the first identification;
report a first power measurement of the first signal to the administrating server by the transceiver;
receive a notification message from the administrating server by the transceiver, wherein the notification message comprises an indication of intercepting communication;
intercept communication data of the first user equipment by the transceiver based on the notification message.

14. The first intercepting user equipment as claimed in claim 13, wherein the processor is further configured to:
transmit a power adjustment request to the administrating server by the transceiver via the eNB directly so that the administrating server notifies the eNB of transmitting a power adjustment command to the first user equipment for adjusting transmitting power of the first user equipment.

15. The first intercepting user equipment as claimed in claim 14, wherein the processor is further configured to:
receive a stop notification message from the administrating server by the transceiver and stop intercepting communication data of the first user equipment.

* * * * *